(12) United States Patent
Harada et al.

(10) Patent No.: US 10,329,386 B2
(45) Date of Patent: Jun. 25, 2019

(54) SELF-RESTORING MACROMOLECULAR MATERIAL AND PRODUCTION METHOD FOR SAME

(71) Applicant: Osaka University, Suita-shi (JP)

(72) Inventors: Akira Harada, Suita (JP); Yoshinori Takashima, Suita (JP); Yuichiro Kobayashi, Suita (JP); Masaki Nakahata, Suita (JP); Shoko Mori, Suita (JP)

(73) Assignee: Osaka University, Suita-shi (JP)

( * ) Notice: Subject to any disclaimer, the term of this patent is extended or adjusted under 35 U.S.C. 154(b) by 0 days.

(21) Appl. No.: 15/322,826

(22) PCT Filed: Jun. 19, 2015

(86) PCT No.: PCT/JP2015/067744
§ 371 (c)(1),
(2) Date: May 3, 2017

(87) PCT Pub. No.: WO2016/006413
PCT Pub. Date: Jan. 14, 2016

(65) Prior Publication Data
US 2017/0233533 A1    Aug. 17, 2017

(30) Foreign Application Priority Data
Jul. 8, 2014  (JP) .................. 2014-140905

(51) Int. Cl.
*C08G 65/337* (2006.01)
*C08L 101/00* (2006.01)
(Continued)

(52) U.S. Cl.
CPC ......... *C08G 83/007* (2013.01); *C08G 65/337* (2013.01); *C08G 65/3346* (2013.01); *C08G 65/33306* (2013.01); *C08L 101/00* (2013.01)

(58) Field of Classification Search
None
See application file for complete search history.

(56) References Cited

U.S. PATENT DOCUMENTS 5,855,900 A * 1/1999 Nobuhiko ............. 424/425
6,037,387 A * 3/2000 Yui et al. .............. 523/112
(Continued)

FOREIGN PATENT DOCUMENTS

JP  2006-513992 A   4/2006
JP  2008-239722 A  10/2008
(Continued)

OTHER PUBLICATIONS

Polyrotaxane Derivative. II. Preparation and Charcterization of Ionic Polytrotaxanes and Ionic slide-ring gels. (Year: 2011).*
(Continued)

*Primary Examiner* — Peter A Salamon
(74) *Attorney, Agent, or Firm* — Locke Lord LLP; James E. Armstong, IV; Nicholas j. DiCeglie, Jr.

(57) ABSTRACT

Provided is a self-restoring macromolecular material that not only has excellent stress relaxation but that can also be easily restored to its original state, even when damaged or severed. Also provided is a method for producing the self-restoring macromolecular material. The self-restoring macromolecular material contains a crosslinked structure that is formed by crosslinking a polymer containing at least a polyrotaxane molecule. The polyrotaxane molecule is formed so as to include a cyclic molecule 21 and a linear molecule that passes through an opening 21a of the cyclic molecule. The crosslinked structure 1 is crosslinked via a reversible bond between the cyclic molecule of the polyrotaxane molecule and a polymer molecule other than the polyrotaxane molecule.

7 Claims, 11 Drawing Sheets

(51) Int. Cl.
  *C08G 83/00*   (2006.01)
  *C08G 65/333*  (2006.01)
  *C08G 65/334*  (2006.01)

(56) References Cited

U.S. PATENT DOCUMENTS

| | | | | |
|---|---|---|---|---|
| 6,100,329 | A * | 8/2000 | Gibson et al. | 525/55 |
| 6,828,378 | B2 * | 12/2004 | Okumura | A61K 47/40 525/403 |
| 2001/0033868 | A1 * | 10/2001 | Rossling et al. | 424/497 |
| 2003/0171573 | A1 * | 9/2003 | Yui | A61K 31/724 536/103 |
| 2004/0162275 | A1 * | 8/2004 | Yui | A61K 31/724 514/183 |
| 2005/0101624 | A1 * | 5/2005 | Betts et al. | 514/291 |
| 2005/0123614 | A1 * | 6/2005 | Kim et al. | 424/489 |
| 2008/0097039 | A1 * | 4/2008 | Ito | B01J 20/26 525/384 |
| 2009/0011933 | A1 * | 1/2009 | Ito | B01J 20/26 502/402 |
| 2009/0030108 | A1 * | 1/2009 | Ito | A61L 27/18 523/106 |
| 2009/0131588 | A1 * | 5/2009 | Ito | C08B 37/0015 525/54.2 |
| 2009/0202461 | A1 * | 8/2009 | Rodriguez | A61K 8/738 424/63 |
| 2009/0312490 | A1 * | 12/2009 | Ito | C08B 37/0015 525/54.2 |
| 2009/0312491 | A1 * | 12/2009 | Ito | C08B 37/0012 525/54.26 |
| 2009/0312492 | A1 * | 12/2009 | Ruslim | A61K 8/738 525/55 |
| 2011/0256393 | A1 * | 10/2011 | Arai | C08G 18/4072 428/352 |
| 2011/0286947 | A1 * | 11/2011 | Luukas | A61K 8/86 424/61 |
| 2013/0224881 | A1 * | 8/2013 | Thompson | C08G 83/007 436/501 |
| 2013/0331562 | A1 * | 12/2013 | Yamasaki et al. | 536/46 |
| 2015/0073091 | A1 | 3/2015 | Harada et al. | |
| 2016/0083485 | A1 * | 3/2016 | Thompson | A61K 31/724 424/1.73 |
| 2017/0233533 | A1 * | 8/2017 | Harada | C08G 65/337 527/312 |

FOREIGN PATENT DOCUMENTS

| | | |
|---|---|---|
| JP | 2012-046596 A | 3/2012 |
| WO | 2004/032862 A2 | 4/2004 |
| WO | 2005/080470 A1 | 9/2005 |
| WO | 2006/115255 A1 | 11/2006 |
| WO | 2008/108411 A1 | 9/2008 |
| WO | 2010/067744 A1 | 6/2010 |
| WO | 2013/162019 A1 | 10/2013 |

OTHER PUBLICATIONS

Ryota Nishizawa et al., "Synthesis of polyrotaxane having thermally reversible cross-links," Polymer Preprints, Japan, 2011, vol. 60, No. 1, p. 1715 (3Pc091). (cited in the ISR).

Yu Kojima et al. "Preparation and evaluation of sugar responsive slide-ring gels with phenylboronic acids," Cyclodextrin Symposium Koen Yoshishu, 2012, 29th, pp. 200-201(P-47). (cited in the ISR).

"Complex Formation between Poly(ethylene glycol)and alpha-Cyclodextrin," Macromolecules, 1990, vol. 23, pp. 2821-2823. Revised Manuscript Received Mar. 5, 1990.

Akira Harada et al., "The molecular necklace: a rotaxane containing many threaded alpha-cyclodextrons," Nature, 1992, vol. 356, pp. 325-327. Accepted Mar. 26, 1992.

Yasushi Okumura et al., "The Polyrotaxane Gel: A Topological Gel by Figure-of-Eight Cross-links," Advanced Materials, 2001, vol. 13, No. 7, pp. 485-487. Final version: Nov. 19, 2000.

Kohzo Ito, "Slide-ring materials using topological supramolecular architecture," Current Opinion in Solid State and Materials Science, 2010, vol. 14, pp. 28-34. Accepted Aug. 27, 2009.

International Search Report dated Sep. 29, 2015, issued for PCT/JP2015/067744.

* cited by examiner (a)

1: Crosslinked structure
2: Polyrotaxane molecule
21: Cyclic molecule
21a: Opening
22: Linear molecule
23: Blocking group
25: First functional group
3: Second polymer
35: Second functional group (b)

Ad-DMEDA-PRx (c)

(Ad-DMEDA-PRx)-(β-CD-poly AAm) gel (a)

(b) 
Cut (c) 
Contacted

Synthetic Scheme 1

Synthetic Scheme 5

Synthetic Scheme 6

Synthetic Scheme 7

Synthetic Scheme 9

Synthetic Scheme 11

SELF-RESTORING MACROMOLECULAR MATERIAL AND PRODUCTION METHOD FOR SAME

TECHNICAL FIELD

The present invention relates to a self-restoring macromolecular material and a method for producing the macromolecular material.

BACKGROUND ART

Macromolecular materials having self-restoring and shape memory properties have been actively researched and developed in recent years. In particular, in view of the recent incessant occurrence of accidents caused by damage and deterioration of materials, enhancing the reliability of materials is considered to be highly useful. One approach for enhancing the reliability of materials is to increase the durability of the materials themselves. If a material has a self-restoring function in addition to durability, reliability with regard to safety is increased and cost advantages are also attained.

When such a self-restoring macromolecular material is used as a member of or a surface-coating agent for cellular phones, displays, automobiles, etc., even if the material is damaged, the damage can be spontaneously repaired. Therefore, the self-restoring macromolecular material is considered to be highly useful in terms of enhancing product durability and also maintaining design for a long period of time. However, in order to enhance mechanical strength, etc., general macromolecular materials are formed into a three-dimensional network structure by covalent crosslinking between chain macromolecules. When stress is applied to such a macromolecular material, the stress tends to concentrate on short portions of the three-dimensional network, thus leading to material damage. Once the bonds in crosslink points of the three-dimensional network are broken, bonding back to the original state (rebonding) is impossible. Therefore, self-restoration is usually difficult. Accordingly, in order to impart a self-restoring function to a macromolecular material, for example, Patent Literature 1 (PTL 1) proposes a crystalline macromolecular crosslinked product composed of a macromolecular crosslinked structure and many dangling chains bonded to the macromolecular crosslinked structure (i.e., partial chains with one end being linked to the crosslinked structure and the other end being not linked to the crosslinked structure). This macromolecular crosslinked product exerts a self-restoring function through entanglement interaction of the dangling chains, which become active at the crystalline melting point or a higher temperature.

CITATION LIST

Patent Literature

PTL 1: JP2008-239722A

SUMMARY OF INVENTION

Technical Problem

However, the macromolecular crosslinked product proposed in PTL 1 has the following problems: the self-restoring function is not exerted unless a heating treatment is performed; self-restorability is reduced with repeated damaging and restoring; and the macromolecular crosslinked product tends to lose its original properties after restoration. Thus, there is still room for improvement in self-restorability.

The present invention has been accomplished based on the above finding. An object of the present invention is to provide a self-restoring macromolecular material that not only has excellent stress relaxation but that can also be easily restored to its original state, even when damaged or severed. Another object of the present invention is to provide a method for producing the self-restoring macromolecular material.

Solution to Problem

To achieve these objects, the present inventors carried out extensive research. As a result, the inventors found that the objects can be achieved by using a crosslinked structure that is formed by crosslinking a polymer containing at least a polyrotaxane molecule via a reversible bond. The present invention has been accomplished based on this finding.

Specifically, the present invention provides the following self-restoring macromolecular materials and methods for producing the self-restoring macromolecular materials.

1. A self-restoring macromolecular material comprising a crosslinked structure that is formed by crosslinking a polymer containing at least a polyrotaxane molecule, the polyrotaxane molecule comprising a cyclic molecule and a linear molecule passing through an opening of the cyclic molecule, the crosslinked structure being crosslinked between the cyclic molecule of the polyrotaxane molecule and a polymer molecule other than the polyrotaxane molecule via a reversible bond.
2. The self-restoring macromolecular material according to Item 1, wherein the polymer molecule further comprises a polyrotaxane molecule other than said polyrotaxane molecule.
3. The macromolecular material according to Item 1, wherein the reversible bond is a non-covalent bond between a first functional group bonded to the cyclic molecule of the polyrotaxane molecule and a second functional group bonded to a side chain of the polymer molecule.
4. The macromolecular material according to Item 3, wherein the non-covalent bond is at least one member selected from the group consisting of bonds between a host group and a guest group, hydrophobic interactions, hydrogen bonds, ionic bonds, coordinate bonds, pi-electron interactions, and intermolecular interactions other than these.
5. The macromolecular material according to Item 4, wherein the host group is a cyclodextrin.
6. The macromolecular material according to Item 1, wherein the crosslinked structure is formed by crosslinking the cyclic molecule of the polyrotaxane molecule with the polymer molecule via a B—O bond.
7. The macromolecular material according to Item 6, wherein the crosslinked structure is formed by crosslinking the cyclic molecule of the polyrotaxane molecule with the polymer molecule through a boronic acid derivative.
8. The macromolecular material according to Item 7, wherein the boronic acid derivative is a phenyldiboronic acid.
9. The macromolecular material according to any one of Items 1 to 8, wherein the cyclic molecule is a cyclodextrin.

10. A method for producing a self-restoring macromolecular material comprising a crosslinked structure that is formed by crosslinking a polymer containing at least a polyrotaxane molecule,
the polyrotaxane molecule comprising a cyclic molecule, a linear molecule passing through an opening of the cyclic molecule, and a first functional group bonded to the cyclic molecule,
the method comprising at least the following steps:
Step A1: mixing the polyrotaxane molecule with a polymerizable monomer mixture to prepare a starting material mixture, the polymerizable monomer mixture containing a polymerizable monomer having a second functional group capable of forming a reversible bond with the first functional group; and
Step A2: performing a polymerization reaction of the polymerizable monomer mixture in the starting material mixture.
11. A method for producing a self-restoring macromolecular material comprising a crosslinked structure that is formed by crosslinking polymers each containing at least a polyrotaxane molecule,
each polyrotaxane molecule comprising a cyclic molecule and a linear molecule passing through an opening of the cyclic molecule, the method comprising mixing a first polyrotaxane molecule having a first functional group bonded to the cyclic molecule with a second polyrotaxane molecule having a second functional group bonded to the cyclic molecule to form the crosslinked structure via a reversible bond between the first functional group and the second functional group.
12. A method for producing a self-restoring macromolecular material comprising a crosslinked structure that is formed by crosslinking a polymer containing at least a polyrotaxane molecule,
the polyrotaxane molecule comprising a cyclic molecule and a linear molecule passing through an opening of the cyclic molecule, the method comprising mixing the polyrotaxane molecule with a boronic acid derivative.
13. A method for producing a self-restoring macromolecular material comprising a crosslinked structure that is formed by crosslinking a polymer containing at least a polyrotaxane molecule,
the polyrotaxane molecule comprising a cyclic molecule and a linear molecule passing through an opening of the cyclic molecule, the method comprising at least the following steps:
Step B1: mixing the polyrotaxane molecule with a polymerizable monomer mixture to prepare a starting material mixture, the polymerizable monomer mixture containing a polymerizable monomer having a B—OH bond on its side chain; and
Step B2: performing a polymerization reaction of the polymerizable monomer mixture in the starting material mixture.

Advantageous Effects of Invention

The self-restoring macromolecular material according to the present invention comprises a crosslinked structure formed by crosslinking a polymer containing at least a polyrotaxane molecule. The crosslinked structure is configured such that the cyclic molecule of a polyrotaxane molecule and a polymer molecule other than the polyrotaxane molecule are crosslinked via a reversible bond. Since the macromolecular material has such crosslinking via a reversible bond, even if the crosslinking is broken due to stress or the like applied to the material itself, rebonding is easy. Therefore, the macromolecular material can be easily restored to its original state even when damaged or severed; furthermore, losses in the properties of the material itself after restoration are fewer. Further, since the macromolecular material contains a polyrotaxane molecule, the material has excellent stress relaxation.

The method for producing a self-restoring macromolecular material according to the present invention is a method suitable for producing a macromolecular material having the above characteristics.

BRIEF DESCRIPTION OF DRAWINGS

FIG. 1(a) is a schematic diagram of the macromolecular material of the first embodiment. FIG. 1(b) is a schematic diagram of the chemical structure of a polyrotaxane molecule in the macromolecular material. FIG. 1(c) is a schematic diagram of the chemical structure of the macromolecular material according to the first embodiment.

FIG. 2(a) shows how the crosslinked structure according to the first embodiment is rebonded. FIG. 2(b) shows how a conventional crosslinked structure is rebonded.

FIG. 3(a) is a schematic diagram, and FIG. 3(b) is an enlarged schematic diagram showing the portion of FIG. 3(a) enclosed in the dashed circle.

FIG. 4(a) is a schematic diagram, and FIG. 4(b) is an enlarged schematic diagram showing the portion of FIG. 4(a) enclosed in the dashed circle.

FIG. 7(a) shows the state of the macromolecular material cut with a cutter knife. FIG. 7(b) shows the state in which the cut surfaces of the fractured macromolecular material are brought into contact with each other. FIG. 7(c) shows the self-restored state achieved by adhering the cut surfaces to each other.

FIG. 9(a) shows the state of the PRx2-pAAmPB (20) gel before cutting. FIG. 9(b) shows the fractured state of the gel. FIG. 9(c) shows the self-restored state achieved by adhering the cut surfaces to each other.

DESCRIPTION OF EMBODIMENTS

Figure 1:
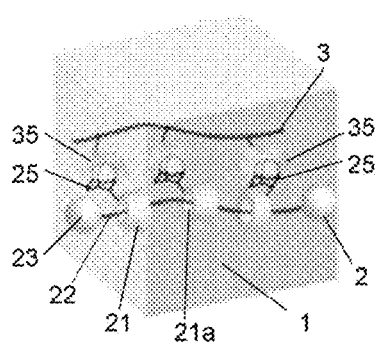
FIG. 1 is a schematic illustration showing a macromolecular material according to the first embodiment of the present invention.
Figure 1:
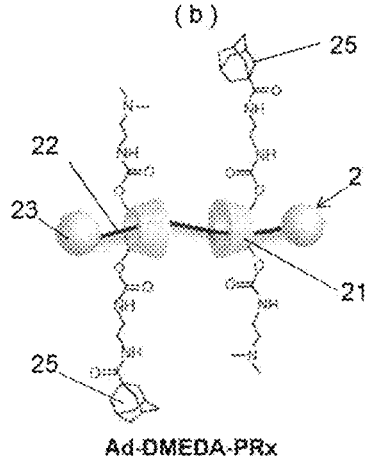
Figure 1:
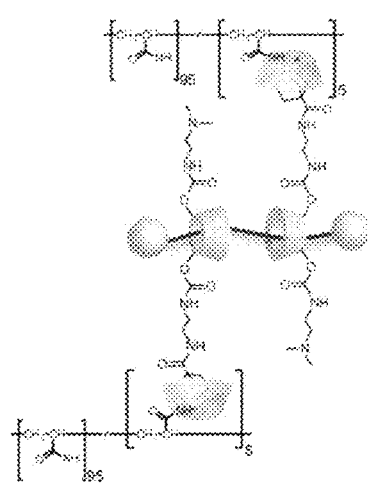

Embodiments of the present invention will now be described in detail below.

The self-restoring macromolecular material (hereinafter simply referred to as "the macromolecular material") is a material comprising a crosslinked structure that is formed by crosslinking a polymer containing at least a polyrotaxane molecule. The polyrotaxane molecule is a polymer comprising cyclic molecules and a linear molecule passing through openings of the cyclic molecules. The polyrotaxane molecule may further have blocking groups attached to both ends of the linear molecule so as to prevent separation of the cyclic molecules from the linear molecule. The crosslinked structure is crosslinked between cyclic molecules of a polyrotaxane molecule and at least either of cyclic molecules of another polyrotaxane molecule or polymer molecules other than polyrotaxane via reversible bonds.

The molecular material having the above features not only has excellent stress relaxation but also can be easily restored to its original state, even when damaged or severed. Furthermore, the molecular material has few losses in the properties of the material itself after restoration.

Polyrotaxane is known to refer to a polymer of a molecule (rotaxane) comprising a combination of a rotor and an axle. Polyrotaxane is configured such that a linear molecule fits into many cyclic compounds in a skewering manner and has on both ends blocking groups, i.e., large substituents that function to prevent the separation of the cyclic compounds from the linear molecule.

The cyclic molecule is not particularly limited as long as it is a compound conventionally used in polyrotaxanes. Examples of cyclic molecules include cyclodextrins, such as α-cyclodextrin, β-cyclodextrin, γ-cyclodextrin, dimethyl cyclodextrin, glucosyl cyclodextrin, and derivatives or modified products of these cyclodextrins; cyclic oligomers, and the like. Examples of cyclic oligomers include ethylene glycol oligomers, ethylene oxide oligomers, propylene glycol oligomers, polysaccharides, and the like. Such cyclic molecules can be used alone or in a combination of two or more to form a polyrotaxane. Of course, cyclic molecules are not limited to those mentioned above as examples, and other types of cyclic molecules may also be used.

The linear molecule is also not particularly limited as long as its main chain capable of passing through the inside of the ring of the cyclic compound is linear. As long as the linear molecule is configured to penetrate the inside of the ring of the cyclic molecule, the linear molecule may have branched chains.

Examples of the linear molecule include polyalkylenes, polyesters, polyethers, polyamides, polyacrylics, and linear molecules having benzene ring(s). Specific examples of linear molecules include polyethylene glycol, polyethylene oxide, polypropylene glycol, polycaprolactone, polyethylene, polypropylene, polyvinyl acetal, polyvinyl methyl ether, polyvinylpyrrolidone, polyacrylamide, polymethyl acrylate, polymethyl methacrylate, polystyrene, and the like. The linear molecule is not limited to those mentioned above as examples, and other types of polymers may also be used as the linear molecule.

The number of cyclic molecules through which the linear molecule passes in a skewering manner, i.e., the number of cyclic molecules through which one linear molecule penetrates (also referred to as the inclusion amount) is not particularly limited. When the cyclic molecule is cyclodextrin, the inclusion amount is 0.15 to 0.4, with the maximum inclusion amount being defined as 1. In this case, the macromolecular material tends to more easily exhibit self-restoration performance.

Further, the weight average molecular weight Mw of the linear molecule is not particularly limited. For example, the weight average molecular weight is preferably 3000 to 500000. In this case, the macromolecular material tends to more easily exhibit self-restoration performance and also has good solubility in solvents. The weight average molecular weight as used herein refers to a molecular weight in terms of polyethylene glycol as measured by gel permeation chromatography (GPC).

The linear molecule preferably has reaction groups on both ends. This facilitates the blocking groups described later to be attached to both ends of the linear molecule. Examples of reaction groups include hydroxyl, carboxyl, amino, thiol, and like groups.

To prevent separation of the cyclic molecules from the linear molecule, the linear molecule may have blocking groups attached to both ends. When the crosslinked structure is a hydrogel containing water, the blocking groups are not always necessary. However, gels other than hydrogels (for example, organogels containing an organic solvent) preferably have blocking groups from the viewpoint of stabilizing the gel structure.

The blocking groups are not particularly limited as long as they can maintain the inclusion of the cyclic molecules. Examples of blocking groups include aryl groups, such as adamantane, dinitrophenyl, cyclodextrins, N-carbobenzoxy-L-tyrosine (Z-L-tyrosine), trityl, pyrenyl, and phenyl; 2-butyldecyl, fluoresceins, and pyrenes; and derivatives or modified products thereof. The blocking groups mentioned above as examples may have one or more substituents. Since such bulky blocking groups are attached to both ends of the linear molecule, the state of cyclic molecules penetrated by a linear molecule in a skewered manner can be maintained.

Blocking groups can be directly or indirectly attached to both ends of the linear molecule via amide bonds, ester bonds, or the like.

When cyclic molecules have an ionic functional group, the blocking groups may also be compounds having an ionic functional group. In this case, the blocking groups and cyclic molecules ionically repel each other, whereby the state in which the cyclic molecules are skewered by the linear molecule can be maintained.

The cyclic molecules of polyrotaxane can freely move while including the linear molecule, but are never separated from the linear molecule due to blocking groups attached to both ends of the linear molecule.

Specific examples of the polyrotaxane molecule include molecules in which the linear molecule is polyethylene glycol, the cyclic molecule is α-cyclodextrin, β-cyclodextrin, or γ-cyclodextrin cyclodextrin, and the blocking group is adamantane. Of course, other polyrotaxanes are also usable. The type and structure of polyrotaxane are not particularly limited.

The weight average molecular weight Mw of the polyrotaxane molecule is not particularly limited. For example, the weight average molecular weight is preferably 15000 to 1000000.

The macromolecular material contains a crosslinked structure of a polymer containing the polyrotaxane molecule described above. Representative examples of embodiments of the macromolecular material are described below in detail.

Macromolecular Material of the First Embodiment

FIG. 1 is a schematic illustration showing a macromolecular material according to the first embodiment. FIG. 1(a) is a schematic diagram of the macromolecular material according to the first embodiment. FIG. 1(b) is a schematic diagram of the chemical structure of a polyrotaxane molecule in the macromolecular material. FIG. 1(c) is a schematic diagram of the chemical structure of the macromolecular material according to the first embodiment. The macromolecular material is described below with reference to FIG. 1.

The macromolecular material according to the first embodiment comprises a crosslinked structure 1. The crosslinked structure 1 is formed by crosslinking a polymer containing a polyrotaxane molecule 2. More specifically, a polyrotaxane molecule 2 and a polymer molecule other than the polyrotaxane molecule are crosslinked via a reversible bond to form a crosslinked structure 1. The "polymer molecule" is hereinafter referred to as "second polymer 3."

The polyrotaxane molecule 2 comprises cyclic molecules 21, a linear molecule passing through the opening 21a of the cyclic molecule, and blocking groups 23 attached to both ends of the linear molecule 22. The structure of the polyrotaxane molecules is as described above.

The cyclic molecule 21 further has a first functional group 25. The first functional group 25 is a functional group capable of forming a reversible bond with a second functional group described later. The first functional group 25 may be directly chemically bonded to the cyclic molecule 21, or may be chemically bonded to the cyclic molecule 21 via another functional group. FIG. 1(b) shows an example of the polyrotaxane molecule 2 in which a first functional group 25 is bonded to a cyclic molecule 21. In this embodiment, an example in which the first functional group 25 is adamantane (also referred to as adamantyl) is shown. The adamantane group as the first functional group 25 is bonded to the cyclic molecule 21 via an amide bond.

The number of first functional groups 25 is usually one per cyclic molecule 21, but may be two or more. All the cyclic molecules 21 in the polyrotaxane molecule 2 may have a first functional group 25, or some of the cyclic molecules 21 may have no first functional group. For example, when one polyrotaxane molecule 2 contains one hundred cyclic molecules 21, it is sufficient that one to eighteen cyclic molecules 21 out of all the cyclic molecules 21 have a first functional group 25 bonded thereto.

Some of the cyclic molecules 21 may have a functional group other than the first functional group 25, i.e., a functional group that does not form a reversible bond with the second functional group 35.

The second polymer 3 has a second functional group 35 on its side chain. Since the second functional group 35 is capable of forming a reversible bond with a first functional group 25, the second polymer 3 is a polymer capable of crosslinking with the polyrotaxane molecule 2 having a first functional group 25. The second functional group 35 may be directly chemically bonded to the main chain of the second polymer 3, or may be chemically bonded to the second polymer 3 via another functional group.

At least one second functional group 35 is usually bonded per molecule of the second polymer 3. The number of second functional groups 35 bonded is not particularly limited. For example, as long as the second polymer 3 has five or more second functional groups 35 per 100 repeating structural units of the second polymer 3, the desired crosslinked structure 1 is formed.

As schematically shown in FIG. 1, the crosslinked structure 1 is formed through a reversible bond between the first functional group 25 of the polyrotaxane molecule 2 and the second functional group 35 of the second polymer 3. This crosslinked structure 1 forms a main matrix in the macromolecular material.

The reversible bond as used herein means a bond other than a covalent bond. It is a bond capable of rebonding even if the bond is broken after the bond is formed. Specific examples of the reversible bond includes a non-covalent bond between a first functional group 25 and a second functional group 35. Specific examples of the non-covalent bond include bonds between a host group and a guest group, hydrophobic interactions, hydrogen bonds, ionic bonds, coordinate bonds, pi-electron interactions, intermolecular interactions other than these, and the like. The non-covalent bond to crosslink the polyrotaxane molecule 2 and the second polymer 3 is not limited to one type; two or more types of non-covalent bonds may be present.

When the reversible bond is a bond between a host group and a guest group, the first functional group 25 may be a guest group, and the second functional group 35 may be a host group, or conversely, the first functional group 25 may be a host group and the second functional group 35 may be a guest group.

Examples of the host group include artificial host molecules, such as cyclodextrin (CD), calixarene, crown ether, cyclophane, cucurbituril, and derivatives thereof. Specific examples include α-cyclodextrin, β-cyclodextrin, γ-cyclodextrin, calix[6]arene sulfonic acid, calix[8]arene sulfonic acid, 12-crown-4,18-crown-6, [6]paracyclophane, [2,2]paracyclophane, cucurbit[6]uril, cucurbit[8]uril, and the like. The host groups mentioned above as examples may be used alone or in a combination of two or more. Preferable host groups are α-cyclodextrin, β-cyclodextrin, and γ-cyclodextrin.

The guest group may be any group that can be a guest group corresponding to the host group described above. Examples of such guest groups include alkyl, cycloalkyl, aryl, arylalkyl, and the like. These functional groups may have one or more substituents.

Examples of the alkyl group include linear, branched, or cyclic $C_{1-18}$ alkyl groups. Specific examples include alkyl groups, such as methyl, ethyl, n-propyl, isopropyl, n-butyl, isobutyl, sec-butyl, tert-butyl, n-pentyl, cyclopentyl, n-hexyl, cyclohexyl, isohexyl, dodecyl, octadecyl, and adamantyl. Among these, adamantyl and butyl are preferable, and adamantyl is particularly preferable. The alkyl group may have 1 to 3 substituents, such as halogen atoms (e.g., fluorine, chlorine, bromine, etc.), carboxyl groups, ester groups, amide groups, and optionally protected hydroxyl groups. Alkyl groups to which the organometallic complex ferrocene is attached as a substituent may also be used.

Examples of the aryl group include monocyclic aryl groups and aryl groups with two or more rings. Specific examples include phenyl, toluyl, xylyl, naphthyl, anthryl, phenanthryl, and the like. Among these, phenyl is preferable. The aryl group may have 1 to 3 substituents, such as alkyl groups (e.g., $C_{1-18}$ alkyl, etc.), nitro groups, halogen atoms (e.g., fluorine, chlorine, bromine, etc.), carboxyl groups, ester groups, amide groups, azo groups having aryl groups, and optionally protected hydroxyll groups.

Examples of the arylalkyl group include linear or branched $C_{1-3}$ lower alkyl groups substituted with monocyclic aryl groups or aryl groups with two or more rings mentioned above. Specific examples include benzyl, naphthylmethyl, anthracene methyl, pyrene methyl, and the like. Benzyl and naphthylmethyl are preferable. The aryl group may have 1 to 3 substituents, such as alkyl groups (e.g., $C_{1-18}$ alkyl groups, etc.), halogen atoms (e.g., fluorine, chlorine, bromine, etc.), carboxyl groups, ester groups, amide groups, azo groups having aryl groups, and optionally protected hydroxyl groups. Specific examples include hydroxyphenylmethyl, methylphenylmethyl, dimethylphenylmethyl, trimethylphenylmethyl, carboxyphenylmethyl, hydroxymethylphenylmethyl, triphenylmethyl, and the like.

When the reversible bond is an ionic bond, the first functional group 25 may be a cationic functional group, and the second functional group 35 may be an anionic functional group. Alternatively, the first functional group 25 may be an anionic functional group, and the second functional group 35 may be a cationic functional group. An example of the cationic functional group is a functional group having a quaternary ammonium salt. An example of the anionic functional group is a functional group having —COO$^-$, —SO$_3^-$, or the like.

The second polymers 3 may be a polymer other than polyrotaxane, or a polymer in which polyrotaxane is the main skeleton. The second polymer 3 may be a mixture of polyrotaxane and a polymer other than polyrotaxane.

When the second polymer 3 is polyrotaxane, the second polymer 3 may have the same structure as the polyrotaxane molecule 2 except that the second polymer 3 has a second functional group 35 in place of the first functional group 25. Of course, when the second polymer 3 is polyrotaxane, the second polymer 3 may be a polyrotaxane that is different from the polyrotaxane molecule 2 in terms of the structure, etc. When the second polymer 3 consists only of polyrotaxane, the crosslinked structure 1 is configured such that polyrotaxanes are crosslinked with each other.

When the second polymer 3 is a polymer other than polyrotaxane, the type of polymer is not particularly limited. Known polymers can be used. Representative specific examples of the second polymer 3 are vinyl polymers obtained by polymerizing vinyl monomers. Other examples include polyurethane resins, polyester resins, polyether resins, polyamide resins, polyimide resins, polyamino acids, polypeptides, polysaccharides, and the like. When the second polymer 3 is a vinyl polymer, specific examples of the vinyl polymer include (meth)acrylic polymers, styrene polymers, (meth)acrylamide polymers, polyethylene, polypropylene, polyoxyethylene, polyethylene glycol, polypropylene glycol, polyvinyl alcohol, polyvinyl acetate, polyvinyl chloride, and the like. As used herein, (meth)acrylate refers to acrylate or methacyrlate, and (meth)acrylic refers to methacrylic or acrylic.

Examples of (meth)acrylic polymers include poly(meth) acrylic acids and salts thereof, and poly(meth)acrylic acid esters such as methyl poly(meth)acrylate, ethyl poly(meth) acrylate, hydroxymethyl poly(meth)acrylate, and hydroxyethyl poly(meth)acrylate. Examples of styrene polymers include polystyrene, polystyrene sulfonates, and the like. Examples of poly(meth)acrylamide polymers include poly (meth)acrylamides, and (meth)acrylamide derivatives such as polydimethyl (meth)acrylamide, polydiethyl (meth)acrylamide, poly-N-isopropylacrylamide, and poly-N-benzylacrylamide. Of course, the vinyl polymer is not limited to those mentioned above as examples. Conventionally known vinyl polymers are also usable.

The second polymer 3 may be a homopolymer, or a copolymer obtained by copolymerzing monomers. When the second polymer 3 is a copolymer, the second polymer 3 may be any of random copolymers, alternating copolymers, graft copolymers, or block copolymers. The side chain of the second polymer 3 may be substituted with a functional group other than the second functional group 35. That is, as long the desired effect of the present invention is not impaired, the main chain and side chains of the second polymer 3 may be modified with other substitutents by chemical bonds or the like.

The crosslinked structure 1 is formed via a reversible bond between the polyrotaxane molecule 2 and the second polymer 3, as described above. The crosslinked structure 1 may have a portion where the polyrotaxane molecule 2 and the second polymer 3 are crosslinked via a covalent bond. That is, the crosslinked structure 1 must have crosslink points formed through reversible bonds but may further contain crosslink points formed through covalent bonds.

The macromolecular material containing the crosslinked structure 1 may be formed into a gelatinous material containing a solvent, i.e., a so-called polymer gel. Of course, the form of the macromolecular material is not limited to polymer gels. The macromolecular material may be in a solid state. For example, the macromolecular material may be in the form of a film, plate, or bulk.

The macromolecular material may further contain a substance other than the crosslinked structure 1, as long as the self-restoring function is not impaired. Examples of such other substances include additives, such as antioxidants, ultraviolet absorbers, light stabilizers, and various fillers. In order to improve the mechanical characteristics, etc., of the macromolecular material, the macromolecular material may contain a macromolecular compound other than the crosslinked structure 1.

When the macromolecular material is formed into a polymer gel, the macromolecular material contains a solvent, a salt, etc., in addition to the crosslinked structure 1. Examples of the solvent include water and organic solvents, such as alcohol.

As schematically shown in FIG. 1(c), the crosslinked structure 1 according to the first embodiment is configured to have a three-dimensional network structure of the polyrotaxane molecule 2 and the second polymer 3 via a reversible bond between the first functional group 25 and the second functional group 35. According to this embodiment, the second polymer 3 is polyacrylamide, and some of the side chains of the repeating structural units are substituted with cyclodextrins. This second polymer 3 is a random copolymer. A representative example of the polyrotaxane molecule 2 is a molecule in which the cyclic molecule 21 is α-cyclodextrin, the linear molecule 22 is polyethylene glycol, and the blocking group 23 is adamantane or tyrosine.

The polyrotaxane molecule 2 in the crosslinked structure 1 comprises cyclic molecules 21 that can freely move along with the linear molecule 22. Therefore, even when stress is applied to the macromolecular material, stress is relaxed by movement of the cyclic molecules 21. Accordingly, the macromolecular material has excellent stress relaxation.

The crosslinked structure 1 is crosslinked via a non-covalent bond (for example, a bond between a host group and a guest group). When more than a certain level of stress is applied to the macromolecular material, the non-covalent bond may be dissociated (broken), thus damaging or fracturing the material. However, the non-covalent bond is a reversible bond. That is, even when the bond is broken, rebonding is possible. Therefore, when the damaged parts or fractured parts are brought into contact with each other again, the broken non-covalent bond is rebonded. As a result, the damaged parts disappear from the macromolecular material and rebonding of the broken parts occurs, so that the macromolecular material is restored to its original state, that is, self-restoration can be achieved.

Figure 2:
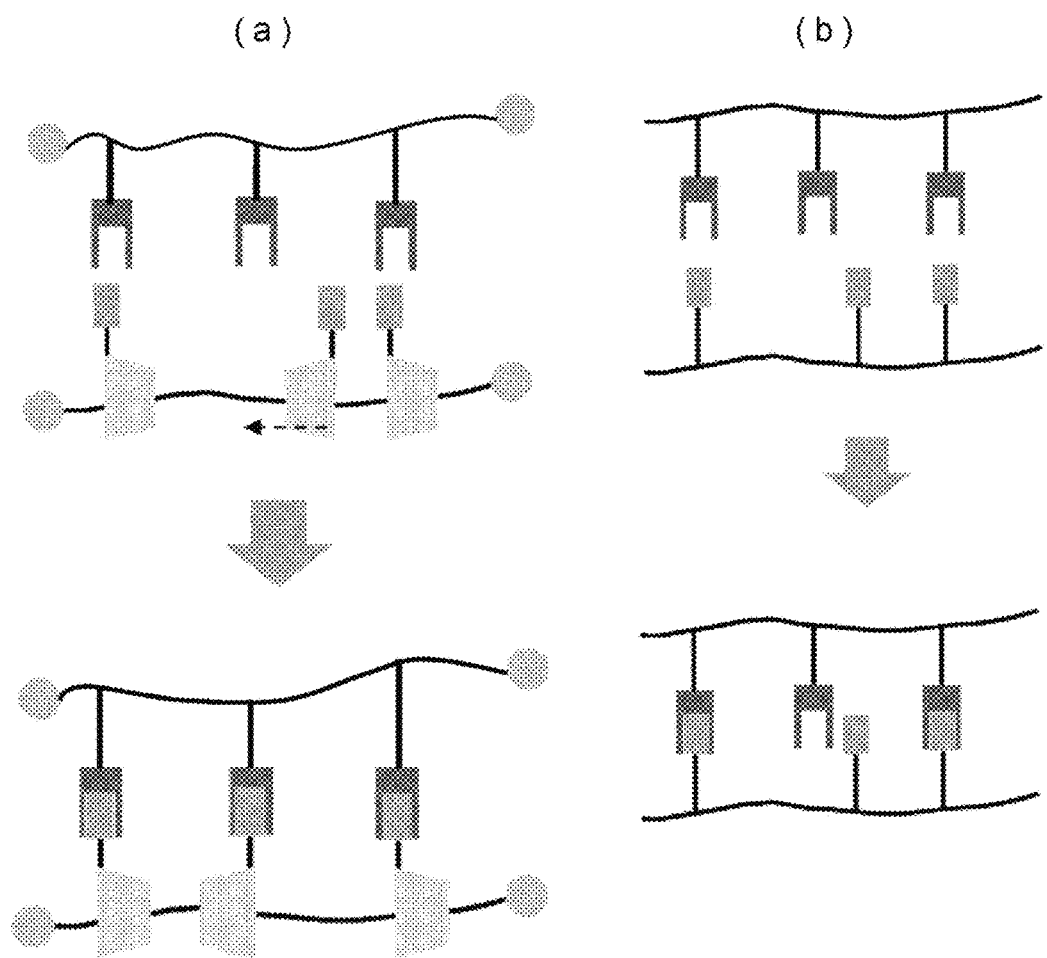
FIG. 2 is an illustration showing how the broken crosslink points in the crosslinked structure of the macromolecular material are rebonded.

FIG. 2 schematically shows how the macromolecular material restores itself. As shown in FIG. 2(a), even when a non-covalent bond is broken, cyclic molecules 21 can freely move in the dashed-line-arrow direction to rebond. Therefore, rebonding can be done while the cyclic molecules 21 are moving. In contrast, as shown in FIG. 2(b), in the case of a polymer in which crosslink points cannot freely move, unlike the polyrotaxane molecule 2, rebonding is difficult to occur. The crosslinked structure 1 containing the polyrotaxane molecule 2 is considered to be an advantageous material because, due to the presence of cyclic molecules 21 that can freely move, the collision probability between the cyclic molecules and their binding partners is increased through the Brownian movement of the molecules and rebonding can be efficiently performed compared with conventional polymers. In particular, the crosslinked structure 1 has a feature in that even when the macromolecular material is damaged or severed, merely bringing the damaged sites or cut surfaces into contact with each other causes rebonding of the reversible bond, and self-restoration is thus particularly easy. In contrast, when using a polymer whose crosslink points cannot freely move as in FIG. 2(b) or when crosslinking is formed by a covalent bond, merely bringing the cut surfaces or the like into contact with each other does not cause rebonding, so self-restoration is difficult. Accordingly, the macromolecular material according to this embodiment has high self-restorability and can be restored in less time than conventional materials. Furthermore, since the macromolecular material tends to return closer to the state of the original material after restoration, losses in the original material properties, such as material strength, transparency, and like material functions, tend to be few.

Since various polymers other than the polyrotaxane molecule 2 are also applicable as the second polymer 3 of the crosslinked structure 1 as described above, a suitable material design can be used according to the required characteristics, thus providing high design flexibility.

Method for Producing the Macromolecular Material According to the First Embodiment The method for producing the macromolecular material according to the first embodiment is not limited. The macromolecular material can be produced, for example, by performing at least the following steps:

step A1: mixing a polyrotaxane molecule with a polymerizable monomer mixture to prepare a starting material mixture, the polymerizable monomer mixture containing a polymerizable monomer having a second functional group; and step A2: performing a polymerization reaction of the polymerizable monomer mixture in the starting material mixture.

The polyrotaxane molecule used in step A1 comprises at least one cyclic molecule and a linear molecule passing through the opening of the cyclic molecule. The structure and type of polyrotaxane molecule are as described above. The polyrotaxane molecule may have blocking groups attached to both ends of the linear molecule. The cyclic molecule is also the same in having a first functional group as described above, and the type of functional group is also the same.

The polyrotaxane molecule having a first functional group can be produced in advance before step A1. The method for producing the polyrotaxane molecule having a first functional group is not particularly limited, and conventional methods can be used. For example, the polyrotaxane molecule can be produced in the following manner. First, a cyclic molecule and a linear molecule are mixed so that the linear molecule passes through the opening of the cyclic molecule in a skewering manner so as to include the cyclic molecule on the linear molecule, thus preparing a polyrotaxane precursor. Subsequently, after a compound having a blocking group is attached to each end of the polyrotaxane precursor (both ends of the linear molecule), a compound having a first functional group is bonded to the cyclic molecule to produce a polyrotaxane molecule having the first functional group. The linear molecule and the cyclic compound used herein are as described above.

Examples of the compound having a blocking group include Z-L-tyrosine, 1-adamantanecarboxylic acid, 1-adamantanamine, trinitrobenzene, α-cyclodextrin, β-cyclodextrin, γ-cyclodextrin, compounds having trityl, and the like.

The compound having a first functional group can be suitably selected according to the type of first functional group. Examples include 1-adamantanecarboxylic acid, 1-adamantanamine, benzylamine, α-cyclodextrin, β-cyclodextrin, γ-cyclodextrin, and the like. These compounds are reacted with a hydroxyl group of a cyclic molecule, such as cyclodextrin, to introduce a first functional group into the cyclic molecule. The first functional group is as described above.

The polymerizable monomer mixture contains at least a polymerizable monomer having a second functional group (hereinafter simply referred to as "a first polymerizable monomer"). The polymerizable monomer mixture may contain a polymerizable monomer other than the first polymerizable monomer (hereinafter simply referred to as "a second polymerizable monomer"). Specifically, the polymerizable monomer mixture can contain a polymerizable monomer having no second functional group.

Examples of the second polymerizable monomer include monomers having a radically polymerizable vinyl group. Specific examples include (meth)acrylic acid and salts thereof, (meth)acrylic acid esters, (meth)acrylamide, styrene, styrenesulfonic acid and salts thereof, α-methylstyrene, ethylene, propylene, vinyl alcohol, vinyl chloride, vinyl acetate, and the like. Examples of (meth)acrylic acid esters include ethyl (meth)acrylate, hydroxymethyl (meth)acrylate, hydroxyethyl (meth)acrylate, and the like. Examples of (meth)acrylamide include (meth)acrylamide, and (meth)acrylamide derivatives, such as dimethyl (meth) acrylamide, diethyl (meth)acrylamide, N-isopropylacrylamide, and N-benzylacrylamide.

The second polymerizable monomer may include a so-called polyfunctional monomer, i.e., a monomer having two or more radically polymerizable vinyl groups. Examples of polyfunctional monomers include divinylbenzene, ethylene glycol dimethacrylate, methylene bisacrylamide, and the like.

Examples of the second polymerizable monomer include monomers other than monomers having a radically polymerizable vinyl group. For example, conventionally known monomers that are polymerized to form polyurethane resins, polyester resins, polyether resins, polyamide resins, polyimide resins, polyamino acids, polypeptides, polysaccharides, and the like, can be used.

Examples of the first polymerizable monomer having a second functional group include a monomer having a second functional group bonded to a side chain of the second polymerizable monomer. Specific examples include host group-containing monomers, guest group-containing monomers, ionic polymerizable monomers, and the like.

Examples of host group-containing monomers include vinyl monomers containing one or more (preferably one) host groups. The type of host group is as described above. Examples of host-containing monomers include polymerizable monomers represented by the following formula (1):

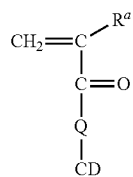

(1)

(In formula (1), Q is O or NH; CD is α-cyclodextrin, β-cyclodextrin, or γ-cyclodextrin; and $R^a$ is hydrogen or methyl.)

Q is preferably NH. Preferable examples of the monomer represented by formula (1) include 6-(meth)acrylamide-α-cyclodextrin, 6-(meth)acrylamide-β-cyclodextrin, α-cyclodextrin methacrylate, β-cyclodextrin methacrylate, α-cyclodextrin acrylate, and β-cyclodextrin acrylate.

The guest group-containing monomer includes a vinyl monomer containing one or more (preferably one) guest groups. The type of guest group is as described above. Examples of the guest group-containing monomer include monomers represented by the following formula (2):

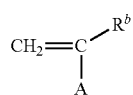

(2)

(In formula (2), A is optionally substituted aryl, C(O)$OR^1$, or C(O) $NHR^1$; $R^1$ is optionally substituted alkyl, optionally substituted aryl, or optionally substituted arylalkyl; and $R^b$ is hydrogen or methyl).

Examples of the alkyl group of the optionally substituted alkyl group represented by $R^1$ in formula (2) include linear, branched, or cyclic $C_{1-18}$ alkyl groups. Specific examples include alkyl groups such as methyl, ethyl, n-propyl, isopropyl, n-butyl, isobutyl, sec-butyl, tert-butyl, pentyl, cyclopentyl, hexyl, cyclohexyl, isohexyl, dodecyl, octadecyl, and adamantyl. Among these, adamantyl and butyl are preferable, and adamantyl is particularly preferable. The alkyl group may have 1 to 3 substituents, such as halogen atoms (e.g., fluorine, chlorine, and bromine), carboxyl groups, ester groups, amide groups, and optionally protected hydroxyl groups. Alkyl groups to which the organometallic complex ferrocene is attached as a substituent may also be used.

Examples of the aryl group of the optionally substituted aryl group represented by A and $R^1$ in formula (2) include monocyclic aryl groups, and aryl groups with two or more rings. Specific examples include phenyl, toluyl, xylyl, naphthyl, anthryl, phenanthryl, and the like. Among these, phenyl is preferable. The aryl group may have 1 to 3 substituents, such as alkyl groups (e.g., $C_{1-18}$ alkyl groups), halogen atoms (e.g., fluorine, chlorine, and bromine), carboxyl groups, ester groups, amide groups, azo groups having aryl groups, and optionally protected hydroxyl groups.

Examples of the arylalkyl group of the optionally substituted arylalkyl group represented by $R^1$ in formula (2) include branched or linear $C_{1-3}$ lower alkyl groups substituted with monocyclic aryl groups or aryl groups with two or more rings as mentioned above. Specific examples include benzyl, naphthylmethyl, anthracenemethyl, and pyrenemethyl. Benzyl and naphthylmethyl are preferable. The aryl group may have 1 to 3 substituents, such as alkyl groups (e.g., $C_{1-18}$ alkyl groups), halogen atoms (e.g., fluorine, chlorine, and bromine), carboxyl groups, ester groups, amide groups, azo groups having aryl groups, and optionally substituted hydroxyl groups. Examples of the aryl group include hydroxyphenylmethyl, methylphenylmethyl, dimethylphenylmethyl, trimethylphenylmethyl, carboxyphenylmethyl, hydroxymethylphenylmethyl, triphenylmethyl, and the like.

Preferable examples of monomers represented by formula (2) include n-butyl acrylate, t-butyl acrylate, N-(1-adamantyl) acrylamide, N-benzylacrylamide, N-1-naphthylmethylacrylamide, and styrene.

As a monomer represented by formula (2) wherein A is an optionally substituted aryl group, a commercially available monomer (such as styrene) can be used unmodified.

The host group-containing monomer and the guest group-containing monomer can be produced by known methods (for example, the methods disclosed in WO2013/162019, etc.).

Examples of ionic polymerizable monomers include (meth)acrylic acid salts, styrenesulfonic acid salts, (meth) acrylamide having a quaternary ammonium salt on its side chain, and (meth)acrylic esters having a quaternary ammonium salt on their side chains. Specific examples of ionic polymerizable monomers include sodium (meth)acrylate, sodium styrenesulfonate, a methyl chloride quaternary salt of dimethylaminopropyl acrylamide, (3-acrylamidepropyl) trimethylammonium chloride, and the like.

When the starting material mixture is prepared in step A1, a solvent is used, if necessary. The solvent may be an aqueous solvent. Examples of solvents include water, and a mixed solvent of water and an organic solvent compatible with water. Water is preferable. Examples of the organic solvent compatible with water include N,N-dimethylformamide (DMF), tetrahydrofuran (THF), dimethyl sulfoxide (DMSO), and the like. These organic solvents can be used singly, or in a combination of two or more. The mixing ratio (volume ratio) of water to the organic solvent in the mixed solvent is preferably in the range of 9:1 to 5:5, and particularly preferably 9:1 to 8:2.

In the preparation of the starting material mixture, after a polyrotaxane molecule containing a first functional group is mixed with a polymerizable monomer containing at least a first polymerizable monomer, heating can be performed while stirring.

The stirring means is not particularly limited. Examples of usable methods include methods using magnetic stirrers and stirrer tips, methods using shakers, methods using stirrers, and the like. The stirring temperature and time may vary depending on the types and concentrations of the host group-containing monomer and guest group-containing monomer used. The stirring can be performed at room temperature (20 to 25° C.) for 8 hours to 3 days, and preferably performed at 25° C. for one day.

The heating means is also not particularly limited. Examples of heating means include methods using a hot stirrer, methods using a thermostat bath, and the like. The heating temperature and time vary depending on the types and concentrations of the host group-containing monomer and guest group-containing monomer used. The heating can be performed at 40 to 80° C. for 1 hour to two days, and preferably at 50 to 80° C. for 2 to 6 hours, whereby the above monomers can be substantially uniformly dissolved in an aqueous solvent.

When a second polymerizable monomer is used, the dissolution of the monomer in the aqueous solvent can be performed by heating after completion of the stirring, or by heating with continuous stirring after stirring for the specific period of time.

The proportions of the components in the starting material mixture prepared in step A1 may be, for example, 5 wt. % of polyrotaxane molecule, 5 mol % of the first polymerizable monomer, and 95 mol % of the second polymerizable monomer, based on the total amount of the polyrotaxane molecule and the polymerizable monomers.

The proportions (molar ratio) of the host group-containing monomer and guest group-containing monomer used may be, for example, such that the ratio of the host group-containing monomer to the guest group-containing monomer is in the range of 30:0.5 to 0.5:30. The proportions are preferably such that the ratio of the host group-containing monomer to the guest group-containing monomer is 1:1, such as 0.5:0.5 or 30:30.

If necessary, the starting material mixture may further contain additives, such as stabilizers.

Figure 5:
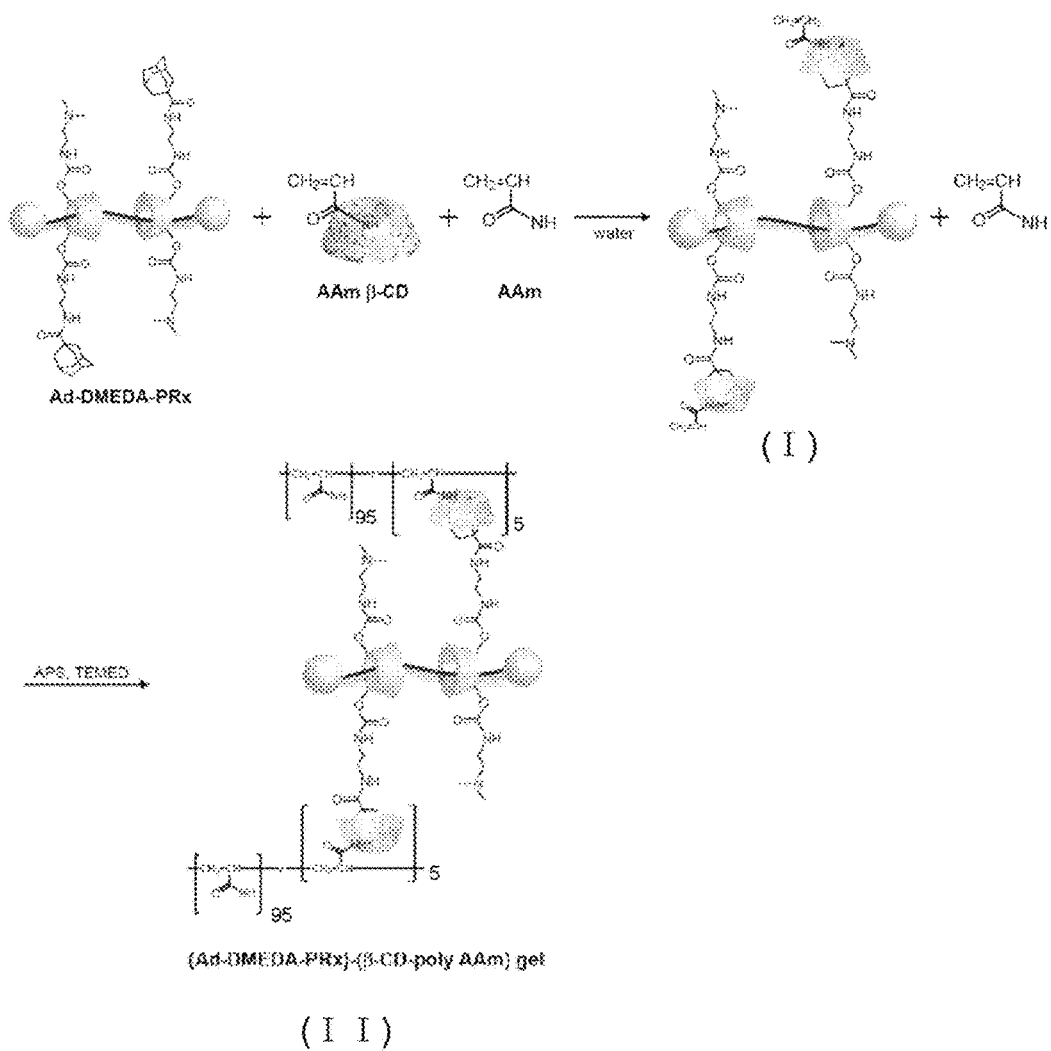
FIG. 5 is a reaction scheme showing an example of the method for producing the macromolecular material according to the first embodiment.

FIG. 5 illustrates a method for producing a macromolecular material according to the first embodiment. A polyrotaxane (Ad-DMEDA-PRx) containing an adamantane group as a first functional group is used as a polyrotaxane molecule; 6-acrylamide-β-cyclodextrin (AAmβ-CD) is used as a polymerizable monomer having a second functional group (a first polymerizable monomer); and acrylamide (AAm) is used as a second polymerizable monomer.

When the starting material mixture is prepared in step A1, a reversible bond is formed between a first functional group bonded to the cyclic molecule of the polyrotaxane molecule and a second functional group bonded to a side chain of the polytmerizable monomer. For example, when the reversible bond is a bond between a host group and a guest group (a host-guest interaction), an inclusion complex comprising a polyrotaxane molecule having a first functional group and a first polymerizable monomer is formed (see FIG. 5 (I)).

In the subsequent step A2, the polymerizable monomer mixture in the starting material mixture obtained in step A1 is polymerized. This forms a polymer by polymerization of the polymerizable monomer mixture and also crosslinks the cyclic molecule of the polyrotaxane molecule and a polymer other than this polyrotaxane molecule via a reversible bond to obtain a crosslinked structure.

The method for the polymerization reaction is not particularly limited. For example, the reaction can be performed by adding to an aqueous solvent a polymerization initiator and optionally a polymerization promoter.

Examples of polymerization initiators include ammonium persulfate (hereinafter sometimes referred to as APS), azobisisobutyronitrile (hereinafter sometimes referred to as AIBN), 2,2'-azobis[2-(2-imidazolin-2-yl)propane]dihydrochloride (hereinafter sometimes referred to as VA-044), 1,1'-azobis(cyclohexanecarbonitrile), di-tert-butylperoxide, tert-butyl hydroperoxide, benzoyl peroxide, photoinitiators (Irgacure® series, etc.), and the like. APS, AIBN, and VA-044 are preferable.

The concentration of the polymerization initiator is preferably 0.5 to 5 mol % per total amount of the polymerizable monomers.

Examples of polymerization promoters include [2-(dimethylamino)ethyl]dimethylamine (sometimes referred to as TEMED), and the like.

The polymerization reaction can be performed, for example, at a temperature of 0 to 100° C., preferably 20 to 25° C., for 1 to 24 hours, and preferably for 12 to 24 hours, although it varies depending on the type of polymerizable monomer used and the half-life temperature of the polymerization initiator.

After step A2 described above is performed, if necessary, purification, drying, and curing may be performed to obtain a macromolecular material containing a crosslinked structure (see the (Ad-DMEDA-PRx)-(β-CD-polyAAm) gel in FIG. 5 (II)). When the polymerization reaction in step A2 is performed in a solvent, the macromolecular material is formed as a so-called polymer gel obtained by swelling a crosslinked structure with a solvent. Alternatively, when the polymerization is performed in the absence of a solvent or a solvent is removed after the polymerization, the macromolecular material can be obtained in bulk or film form. As shown in FIG. 1(a) and FIG. 1(c), the macromolecular material thus obtained is produced as a crosslinked structure 1 in which a polyrotaxane molecule 2 and a second polymer 3 are arranged in a three-dimensional network through reversible bonds between the first functional group 25 and the second functional group 35. Of course, the macromolecular material produced by this method has the above-mentioned functions, such as self-restorability.

The macromolecular material can also be produced by a method other than the method comprising steps A1 and A2. For example, although the polymerization reaction is performed in step A2 after the starting material mixture is prepared in step A1 in the production method described above, it is also possible, for example, to mix a polymer obtained beforehand by polymerization with a polyrotaxane molecule to form a crosslinked structure. That is, it is also possible to form a crosslinked structure by directly mixing a polyrotaxane molecule containing a first functional group with a polymer containing a second functional group.

To efficiently bond a first functional group and a second functional group, it is preferable that as in the production method comprising steps A1 and A2, before a polymerizable monomer is polymerized, a first functional group and a second functional group are bonded to each other in advance to form an inclusion complex, and a polymerization reaction of the polymerizable monomer is performed in this state (hereinafter sometimes simply referred to as a "template polymerizing method"). In particular, when the bond between the first functional group and the second functional group is a bond between a host group and a guest group, a template polymerization method is preferably used. In this case, the desired crosslinked structure can be easily obtained.

Macromolecular Material of the Second Embodiment

FIG. 3(a) is a schematic illustration showing the macromolecular material according to another embodiment (the second embodiment). FIG. 3(b) is an enlarged schematic diagram showing the portion of FIG. 3(a) enclosed in the dashed circle.

The macromolecular material of the second embodiment comprises a crosslinked structure 1. As in the macromolecular material according to the first embodiment, the crosslinked structure 1 is configured such that a polyrotaxane molecule 2 and a second polymer 3, which is a polymer molecule other than the polyrotaxane molecule 2, are crosslinked via a reversible bond.

The crosslinked structure 1 according to this embodiment is such that crosslinking is formed by bonding a polyrotaxane molecule 2 (this polyrotaxane molecule 2 is hereinafter referred to as "the first polyrotaxane molecule 2") to a second polymer 3 via a boronic acid derivative. The cyclic molecule 21 of the first polyrotaxane molecule 2 according to this embodiment does not have to have a first functional group 25 bonded thereto.

Figure 3:
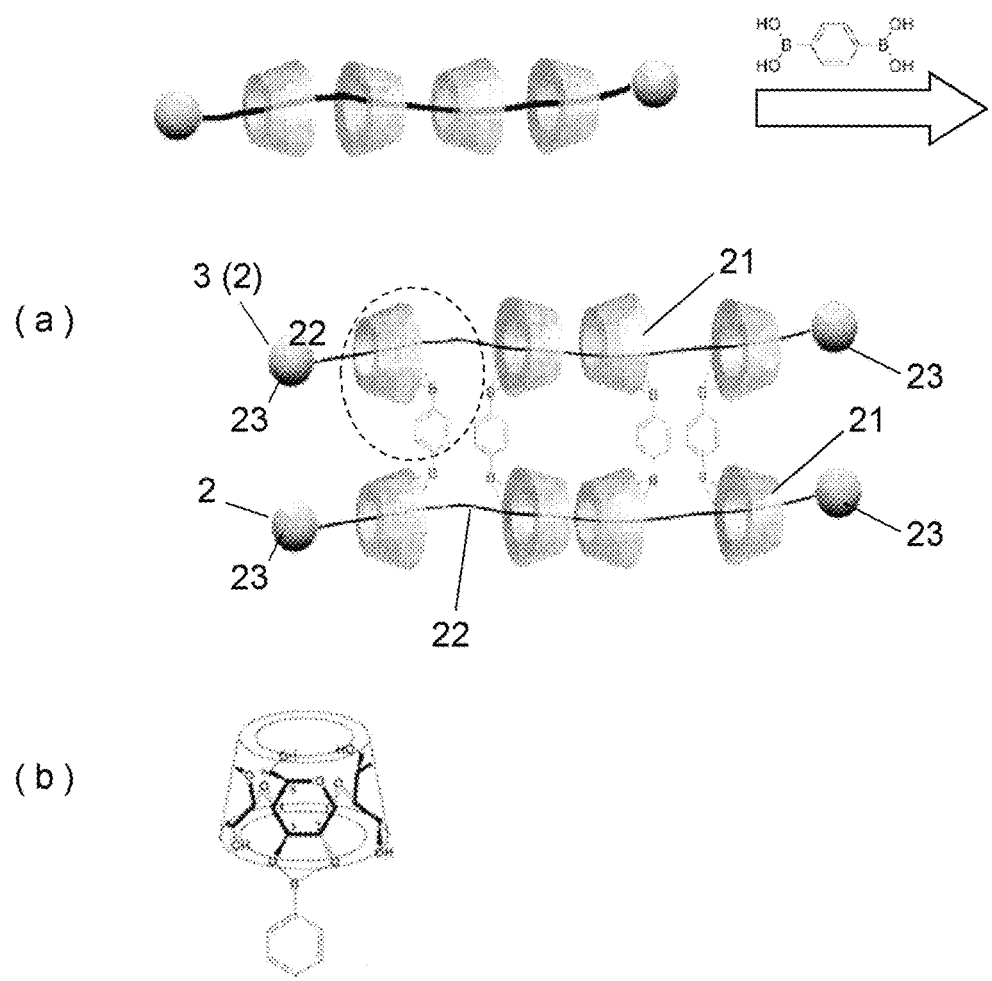
FIG. 3 is a schematic illustration showing a macromolecular material according to the second embodiment.

FIG. 3 shows an embodiment in which the second polymer 3 is also a polyrotaxane molecule 2 (this polyrotaxane molecule 2 is hereinafter referred to as "the second polyrotaxane molecule 2"). The boronic acid derivative comprises phenyldiboronic acid. The first polyrotaxane molecule 2 and the second polyrotaxane molecule 2 are formed to have the same structure. For example, the cyclic molecule 21 may be cyclodextrin, the linear molecule 22 may be polyethylene glycol, and the blocking group 23 may be trinitrobenzene. However, usable molecules and groups are not limited thereto.

As shown FIG. 3(b), one B(OH)$_2$ group of phenyldiboronic acid is bonded to one cyclodextrin (cyclic molecule 21) of a first polyrotaxane molecule 2 to form a B—O bond. Although not shown, the other B(OH)$_2$ of phenyldiboronic acid is also bonded to a cyclodextrin of a second polyrotaxane molecule 2 to form a B—O bond. A crosslinked structure 1 of polyrotaxane is formed through these B—O bonds. Although the B—O bond is a covalent bond, it is a reversible bond like the non-covalent bonds described above. Even when the bond is broken, rebonding is easy.

In FIG. 3(b), when the crosslinked structure 1 is a hydrogel, the B—O bond converts to a B—OH bond in the presence of water. When the crosslinked structure 1 is an organogel, it is in the state of a B—O bond as shown in FIG. 3(b).

As explained above, the macromolecular material comprising the crosslinked structure 1 according to the second embodiment is also formed by a reversible bond as in the first embodiment. Therefore, even when the bond is dissociated (broken) and the material is damaged or fractured, bringing the damaged parts or fractured parts into contact with each other rebonds the broken bond. As a result, the damaged parts disappear from the macromolecular material and rebonding of the fractured parts occurs, so that the macromolecular material can be restored to its original state.

Since the crosslinked structure 1 according to the second embodiment also comprises the polyrotaxane molecule 2, stress relaxation is imparted to the macromolecular material. As in the first embodiment, cyclic molecules 21 can freely move along the linear molecule 22. Therefore, rebonding can be efficiently performed as compared with conventional polymers. Accordingly, the macromolecular material according to the second embodiment also has high self-restorability and can be restored in a shorter time than conventional materials. Furthermore, since the macromolecular material tends to return closer to the state of the original material after restoration, losses in the original material properties, such as material strength, transparency, and like material functions, tend to be few.

Various cyclodextrins can be preferably used as the cyclic molecule 21 in the second embodiment because cyclodextrins can form a reversible bond with a B—OH of a boronic acid derivative.

The boronic acid derivative is not particularly limited to the phenyldiboronic acid mentioned above but also includes other derivatives, such as biphenyldiboronic acid and naphthyldiboronic acid. As the boronic acid derivative, compounds having two or more B—(OH)$_2$ groups per molecule are particularly preferable.

Figure 4:
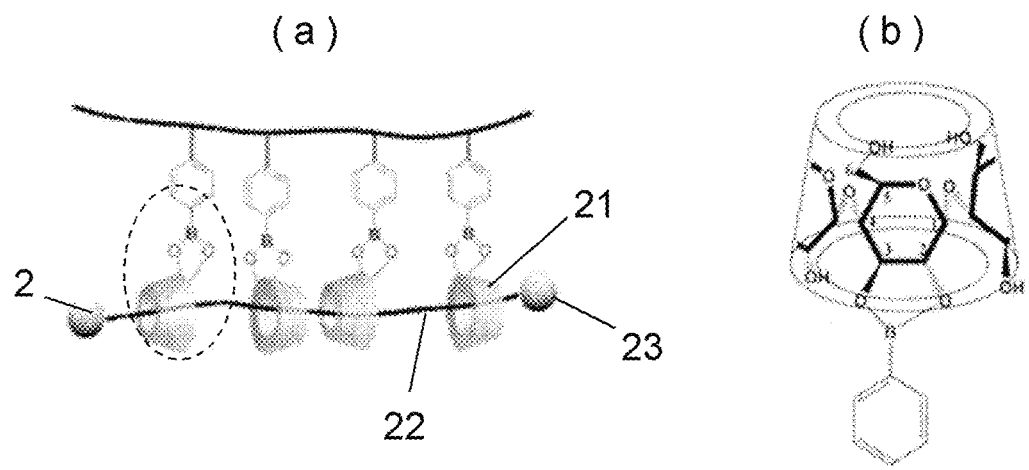
FIG. 4 is a schematic diagram showing another example of the macromolecular material according to the second embodiment.

FIG. 4 is a schematic illustration showing the macromolecular material according to the second embodiment. FIG. 4(a) is a schematic diagram. FIG. 4(b) is an enlarged schematic diagram showing the portion of FIG. 4(a) enclosed in the dashed circle. In the macromolecular material according to this embodiment, the crosslinked structure 1 is such that a polyrotaxane molecule 2 and a second polymer 3 are crosslinked. This macromolecular material is particularly different from the embodiment shown in FIG. 3 in that the second polymer 3 is formed of a polymer having a boronic acid on its side chain. The polyrotaxane molecule 2 may be such that the cyclic molecule 21 is cyclodextrin, the linear molecule 22 is polyethylene glycol, and the blocking group 23 is trinitrobenzene. However, usable molecules and groups are not limited thereto.

The second polymer 3 is such that a B(OH)$_2$ group on its side chain is bonded to a cyclodextrin of the first polyrotaxane molecule 2 to form a B—O bond. A crosslinked structure 1 of polyrotaxane is formed via this B—O bond. As in the embodiment shown in FIG. 3, due to the presence of the B—O bond that is a reversible bond, even when the bond is broken, rebonding is easy and the obtained material has excellent self-restorability. As in the embodiment shown in FIG. 3, when the crosslinked structure 1 is a hydrogel, the B—O bond becomes a B—OH bond in the presence of water. When the crosslinked structure 1 is an organogel, the bond is a B—O bond as shown in FIG. 3(b).

In this embodiment as well, various polymers are applicable as the second polymer 3 of the crosslinked structure 1. Therefore, a suitable material design can be used according to the required characteristics (e.g., transparency), thus providing high design flexibility.

When the second polymer 3 is a polymer other than the polyrotaxane molecule 2, the type of polymer is not particularly limited as long as the polymer has boronic acid on its side chain. The type of polymer may be the same as the resins mentioned as examples of the second polymer 3 in the first embodiment. Specific examples include vinyl polymers, polyurethane resins, polyester resins, polyether resins, polyamide resins, polyimide resins, polyamino acids, polypeptides, polysaccharides, and the like.

When the second polymer 3 is a vinyl polymer, the polymer may have, for example, a repeating structural unit represented by the following formula (3) or a repeating structural unit represented by the following formula (4).

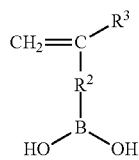
(3)

(In formula (3), $R^2$ is phenyl, biphenyl, or the like, and $R^3$ is hydrogen or methyl. When $R^2$ is phenyl, B (boron) may be bonded to any of the ortho-position, meta-position, and para-position, relative to $CH_2=C(R^3)-$.)

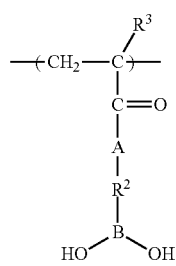
(4)

(In formula (4), $R^2$ represents phenyl, biphenyl, or the like, A represents O or NH, and $R^3$ represents hydrogen or methyl. When $R^2$ is phenyl, B (boron) may be bonded to any of the ortho-position, meta-position, and para-position, relative to $CH_2=C(R^3)-$.) As long as the second polymer has a repeating structural unit derived from the polymerizable monomer, the second polymer 3 may have other repeating structural units. Examples of other repeating structural units include styrene, styrenesulfonic acid and salts thereof; (meth)acrylic acid and salts thereof; and (meth)acrylic acid esters, (meth)acrylamide, (meth)acrylamide derivatives, ethylene, propylene, and like various repeating structural units derived from vinyl monomers. The second polymer 3 may be any of random copolymers, alternating copolymers, graft copolymers, or block copolymers.

When the total number of repeating structural units per molecule of the second polymer 3 is defined as 100, the number of repeating structural units having boronic acid may be, for example, 5 to 50. In this case, an excellent gel crosslinked structure 1 can be formed.

As long as the self-restoring function is not impaired, other additives and other polymers may also be incorporated in the embodiments shown in FIGS. 3 and 4 as well as in the first embodiment.

Method for Producing the Macromolecular Material According to the Second Embodiment The method for producing the macromolecular material according to the embodiment shown in FIG. 3 is not particularly limited. For example, the macromolecular material can be produced by a process comprising mixing a polyrotaxane molecule and a boronic acid derivative (such as phenyldiboronic acid). The polyrotaxane molecule and boronic acid derivative used herein are as described above. The polyrotaxane molecule can be synthesized by or in accordance with conventional methods as described above.

The mixing can be performed by blending a polyrotaxane and a boronic acid derivative at any ratio. For example, when the mass ratio of the polyrotaxane molecule to the boronic acid derivative is 2:1 to 2:3, an excellent gel crosslinked structure can be formed. When the polyrotaxane molecule and the boronic acid derivative are mixed, additives such as stabilizers may be added, if necessary.

The mixing can be performed in a suitable solvent. Examples of solvents include water, alcohol, DMF, DMSO, and the like. The mixing method is not limited, and commercially available agitators and mixers can be used. The mixing temperature and time are also not particularly limited.

When the mixing is performed, the B—OH of the boronic acid derivative is bonded to the cyclic molecule 21 (e.g., cyclodextrin) to form a crosslinked structure, thus obtaining a macromolecular material.

The method for producing the macromolecular material according to the embodiment shown in FIG. 4 can be performed, for example, by using the template polymerization method described above. Specifically, the macromolecular material can be produced by a process comprising the following steps:

step B1: mixing a polyrotaxane molecule with a polymerizable monomer mixture to prepare a starting material mixture, the polymerizable monomer mixture containing a polymerizable monomer having a B—OH bond on its side chain; and step B2: polymerizing the polymerizable monomer mixture in the starting material mixture obtained in step B1.

Figure 6:
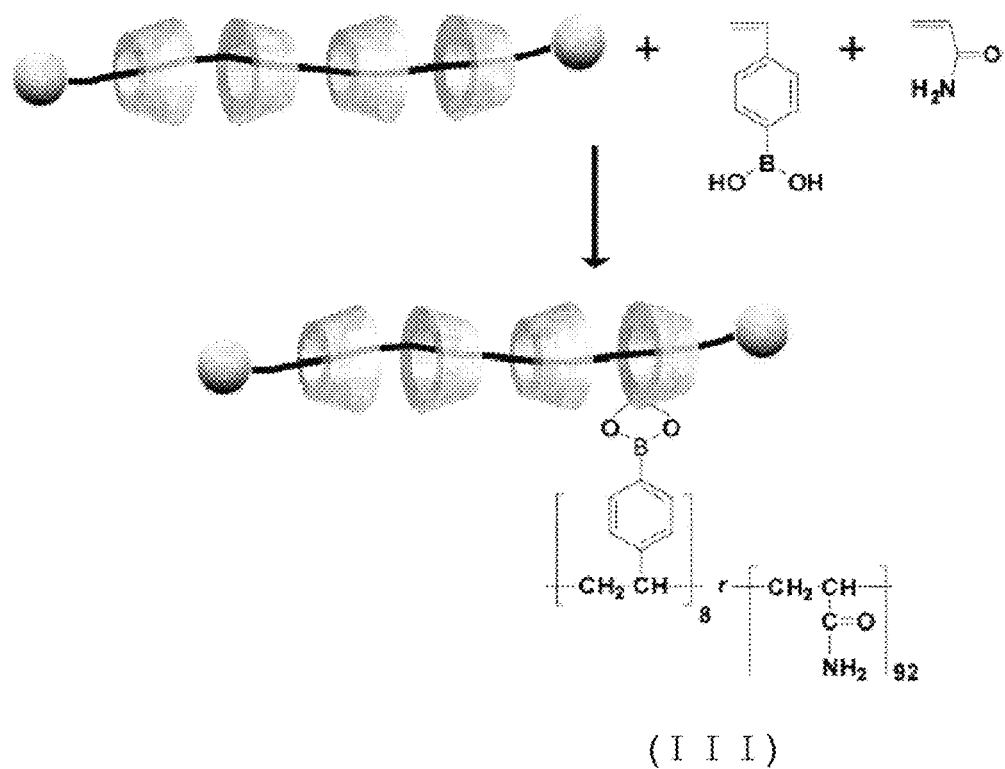
FIG. 6 is a reaction scheme showing an example of the method for producing the macromolecular material according to the second embodiment.

FIG. 6 shows an example of a method for producing a macromolecular material according to the second embodiment. The method uses a polyrotaxane molecule, 6-acrylamide phenylboronic acid (AAmPB) as a polymerizable monomer having a second functional group, and acrylamide (AAm) as a second polymerizable monomer.

The polyrotaxane molecule in step B1 is the same as the polyrotaxane molecule described above. The cyclic molecule does not have to have a first functional group.

A polymerizable monomer having a B—OH bond on its side chain is not particularly limited. Examples include polymerizable vinyl monomers having alkyl boronic acid, phenylboronic acid, or the like on the side chain. Specific examples include polymerizable vinyl monomers represented by formulas (5) and (6).

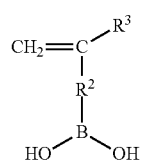
(5)

(in formula (5), $R^2$ is phenyl, biphenyl, or the like, and $R^3$ is hydrogen or methyl. When $R^2$ is phenyl, B (boron) may be bonded to any of the ortho-position, meta-position, and para-position, relative to $CH_2=C(R^3)-$.)

(6)

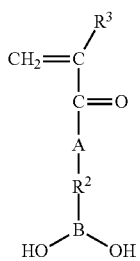

(in formula (6), $R^2$ is phenyl, biphenyl, or the like, A is O or NH, and $R^3$ is hydrogen or methyl).

The polymerizable monomer mixture may contain a polymerizable monomer other than the polymerizable monomer having a B—OH bond on its side chain. In this case, as a polymerizable monomer other than the polymerizable monomer having a B—OH bond on its side chain, the same monomer as the second polymerizable polymer described above in the section of the production method according to the first embodiment may be used.

When a starting material mixture is prepared in step B1 above, a reversible bond is formed between the cyclic molecule of a polyrotaxane molecule and a B—OH group on the side chain of a polymerizable monomer. For example, when the cyclic molecule is cyclodextrin, a reversible bond is formed between an oxygen atom of cyclodextrin and a B—OH group, as shown FIG. 4(*b*).

Subsequently, the macromolecular material containing a crosslinked structure is obtained by performing a polymerization reaction in step B2. When the polymerizable monomer mixture is a mixture of a polymerizable monomer having a B—OH bond on its side chain and another polymerizable monomer mentioned above, both the polymerizable monomers are formed as a random polymer. The polymerization in step B2 can be performed in the same manner as in step A2 described above.

FIG. 6 shows one example of a method for producing the macromolecular material according to the second embodiment. This method uses a polyrotaxane molecule; 4-vinyl phenylboronic acid as a polymerizable monomer containing a B—OH bond; and acrylamide (AAm) as another polymerizable monomer. In this reaction, various starting materials described above are mixed to prepare a starting mixture. This mixture is polymerized to form a crosslinked structure as shown in FIG. 6 (III). This crosslinked structure is synthesized in such a manner that a polyrotaxane molecule and a second polymer are crosslinked via B—O bonds, as shown in FIG. 4.

The macromolecular material can also be produced by methods other than the process comprising steps B1 and B2, i.e., methods other than the template polymerization method. For example, a polymer having B—OH bonds on its side chains may be prepared beforehand, and this polymer and a polyrotaxane molecule may be mixed to form a crosslinked structure. However, to efficiently form a B—O bond between each cyclic molecule and each B—OH group, using the template polymerization method is preferable.

EXAMPLES

The present invention is described in more detail with reference to Examples. However, the scope of the invention is not limited to these Examples.

Synthesis Example of Polyrotaxane Molecule

Synthesis—Example 1

Figure 10:
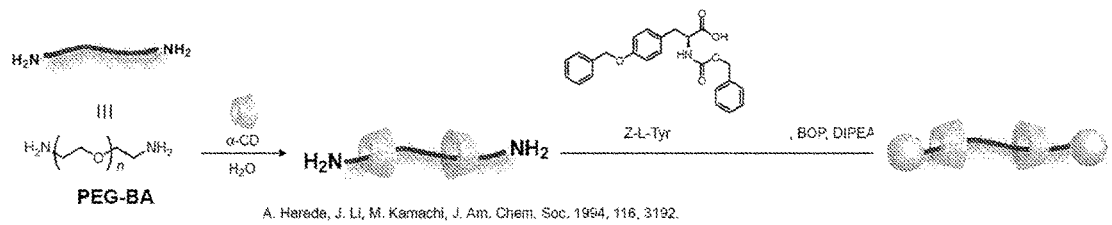
FIG. 10 depicts Synthetic Scheme 1 in which polyrotaxane comprising polyethylene glycol passing through multiple α-cyclodextrins with both ends of the polyethylene glycol being capped (blocked) with Z-L-tyrosine is synthesized.

Polyrotaxane comprising polyethylene glycol passing through multiple α-cyclodextrins with both ends of the polyethylene glycol being capped (blocked) with Z-L-tyrosine (hereinafter simply referred to as "PRx1") was synthesized according to Synthetic Scheme 1—FIG. 10.

PEG-BA (Mn: 35000; 10 g, 0.29 mmol) was added to a saturated aqueous α-CD solution (1.0 L). Immediately after the addition of PEG-BA, a white precipitate was formed. In this state, stirring was performed at room temperature for 24 hours. The precipitate was then collected by filtration and lyophilized. After the obtained solid was suspended in DMF (100 mL), BOP (1.2 g, 2.9 mmol), N,N-diisopropylethylamine (DIPEA 1.0 mL, 2.9 mmol), and Z-L-tyrosine (Z-Tyr 2.3 g, 2.9 mmol) were added, and the resulting mixture was stirred for one day. After stirring, DMSO was added and the mixture was evaporated to remove DMF. The remaining solution was dialyzed (MWCO 8000). When DMSO as a dialysis solvent was replaced with water, the precipitate was formed in the dialysis membrane. This precipitate was collected and lyophilized to synthesize PRx1.

PRx1 was subjected to GPC measurement. The lyophilized sample exhibited a peak at an earlier elution time than PEG35k and α-CD. Synthesis of PRx1 was thus confirmed. The PRx1 penetration rate was 31% (number of penetrations: 120), and the yield of PRx1 was 12%. The PRx1 penetration rate was calculated by $^1$H-NMR spectrum according to the following formula:

Penetration rate (%)=[($^1$H measured value of α-CD)/
($^1$H theoretical value (1) of α-CD)]×100

Synthesis Example 2

Polyrotaxane comprising polyethylene glycol passing through multiple α-cyclodextrins with both ends of the polyethylene glycol being capped (blocked) with adamantane groups (hereinafter abbreviated as "PRx2") was synthesized according to Synthetic Schemes 2 to 6.

Synthetic Scheme 2

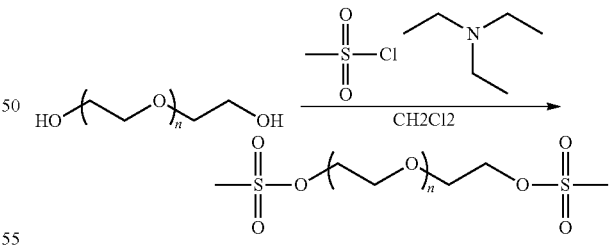

Polyethylene glycol (PEG, Mw=35000, 30.2 g, 0.857 mmol) and triethylamine (TEA, 0.952 g, 9.43 mmol) were dissolved in 500 mL of dichloromethane (DCM) while cooling with ice. After methanesulfonyl chloride (MsCl, 0.981 g) was added, the resulting mixture was returned to room temperature and stirred for 24 hours. When this mixture was separated into phases by adding 300 mL of $H_2O$, an emulsion was formed. Accordingly, the emulsion was filtered through celite and the filtrate was separated into phases again. Subsequently, the filtrate was separated into phases by adding 300 mL of brine, followed by drying over Na$_2$SO$_4$. After filtration, the filtrate was reprecipitated into diethyl ether and the precipitate was collected. This precipitate was redissolved in DCM and reprecipitated in diethyl ether. This precipitate was collected by filtration and dried to obtain a product (MsOPEG). MsOPEG was obtained as a white powder in an amount of 23.8 g (yield: 79.0%).

Synthetic Scheme 3

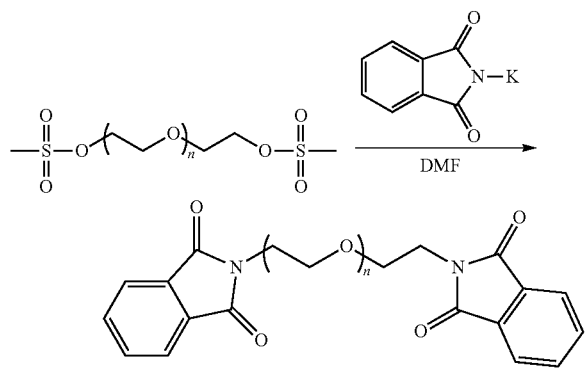

In accordance with the reaction shown in Synthetic Scheme 3, MsOPEG (12.9 g, 0.369 mmol) and potassium phthalimide (0.686 g, 3.71 mmol) were dissolved in 200 mL of dimethylformamide (DMF), and the mixture was stirred at 60° C. for 39 hours. After DMF was distilled off, the residue was dissolved in DCM. The solution was filtered and then concentrated. The concentrate was reprecipitated into diethyl ether. The precipitate was redissolved in DCM and reprecipitated into diethyl ether. This was collected by filtration and dried to obtain a product (PhIPEG). PhIPEG was obtained as a white powder in an amount of 9.61 g (yield: 73.8%).

Synthetic Scheme 4

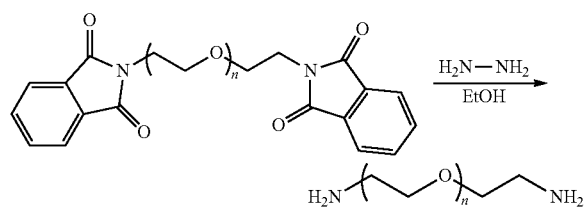

In accordance with the reaction shown in Synthetic Scheme 4, PhIPEG (9.61 g, 0.275 mmol) was dissolved in 85 mL of ethanol, and hydrazine hydrate (274 mg, 5.48 mmol) was added. The resulting mixture was refluxed under Ar atmosphere for 40 hours. This was concentrated and dissolved in DCM. The solution was concentrated again. The concentrate was reprecipitated into diethyl ether, and the precipitate was collected by filtration and then dried to obtain a product (PEGBA). PEGBA was obtained as a white powder in an amount of 8.10 g (yield: 84.4%).

Figure 11:
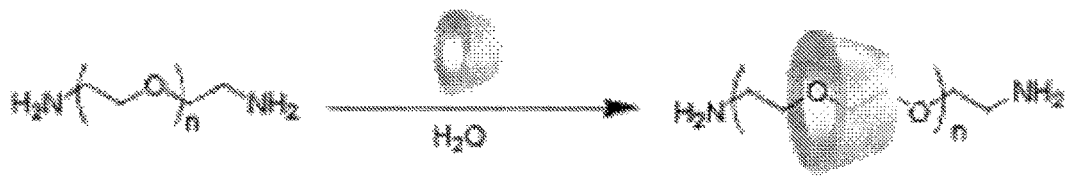
FIG. 11 depicts Synthetic Scheme 5 in which α-CD was suspended in water and PEGBA was added.

In accordance with the reaction shown in Synthetic Scheme 5—FIG. 11, α-CD (82.0 g, 84.4 mmol) was suspended in 490 mL of water. 7.37 g of PEGBA was added and stirring was performed at room temperature for 2 days. A white precipitate was formed. This precipitate was collected by centrifugation and lyophilized.

Figure 12:
FIG. 12 depicts Synthetic Scheme 6 in which the lyophilized white solid was suspended in anhydrous DMF and Adamantane carboxylic acid, BOP, and diisopropylethylamine dissolved in anhydrous DMF were added.

In accordance with the reaction shown in Synthetic Scheme 6—FIG. 12, the lyophilized white solid was suspended in anhydrous DMF (130 mL). Adamantane carboxylic acid (375.9 mg, 2.09 mmol), BOP (928.6 mg, 2.10 mmol), and diisopropylethylamine (369 μL, 2.10 mmol) dissolved in anhydrous DMF were added dropwise, and stirring was performed at room temperature for 2 days. After DMF was distilled off, the residue was dissolved in DMSO and dialyzed with DMSO for 1 week and with water for 1 week (MWCO: 8000). The white precipitate obtained on dialysis with water was collected by centrifugation and lyophilized to obtain PRx2. PRx2 was obtained as a white powder in an amount of 4.06 g at a penetration rate of 17.3% with a yield of 18.9%.

Example of Modifying the Polyrotaxane Molecule with a First Functional Group

A phenyl group or an adamantyl group was selected as a first functional group and introduced into a cyclic molecule (α-cyclodextrin) of the polyrotaxane molecule in accordance with the method shown in Synthesis Examples 3 and 4.

Synthesis Example 3

PRx1 obtained above in Synthesis Example 1 and CDI were dissolved in anhydrous DMSO, and the resulting mixture was stirred at room temperature for 24 hours. After DMEDA (N,N-dimethylethylenediamine) was added, the mixture was further stirred at room temperature for 12 hours. Benzylamine was then added and the resulting mixture was further stirred at room temperature for 12 hours. After stirring, dialysis (MWCO 8000) was performed with DMSO and then with water. As a result, PRx1 having a phenyl group introduced thereinto (hereinafter simply referred to as "Bn (I)-DMEDA(m)-PRx1," wherein (I) represents the number of moles of the first functional group introduced, and (m) represents the number of moles of DMEDA introduced).

Synthesis of Bn(I)-DMEDA(m)-PRx1 was confirmed by GPC and $^1$H-NMR. In this Synthesis Example 3, a total of four types of Bn(I)-DMEDA(m)-PRx1, i.e., Bn3-DMEDA3-PRx1, Bn6-DMEDA3-PRx1, Bn9-DMEDA3-PRx1, and Bn9-DMEDA3-PRx, were synthesized by adjusting the mixing ratio of benzylamine and DMEDA used.

Synthesis Example 4

Synthesis was performed in the same manner as in Synthesis Example 3 except that adamantylamine was used in place of benzylamine. PRx1 having an adamantane group introduced thereinto (hereinafter simply referred to as "Ad (I)-DMEDA(m)-PRx1") was thus obtained. Synthesis of Ad(I)-DMEDA(m)-PRx1 was confirmed by GPC and $^1$H-NMR. In this Synthesis Example 4, a total of four types of Ad(I)-DMEDA(m)-PRx1, i.e., Ad1-DMEDA6-PRx1, Ad3-DMEDA6-PRx1, Ad6-DMEDA6-PRx1, and Ad6-DMEDA3-PRx1, were synthesized by adjusting the mixing ratio of adamantylamine and DMEDA used.

<Synthesis of the Macromolecular Material>

Example 1

Of the four types of the first functional group-modified polyrotaxane molecules obtained in Synthesis Example 4, Ad6-DMEDA6-PRx1 was used as a polyrotaxane molecule. A self-restoring macromolecular material was produced in a manner similar to the synthetic scheme shown in FIG. 5, for reference.

First, Ad6-DMEDA6-PRx1, AAm-β-CD, and acrylamide were dissolved in H$_2$O at a mixing ratio such that the amount of adamantane group (guest group) in Ad6-DMEDA6-PRx1 became equivalent to the amount of β-cyclodextrin in acrylamide β-cyclodextrin (AAm-β-CD), and the solution was shaken at room temperature for 6 hours (the amount of solution was adjusted so that AAm-β-CD+AAm/solution=2M). However, since the amount of the adamantane group is a theoretical calculation value, the actual amount of β-cyclodextrin is considered to be in excess. After the shaking, ammonium persulfate (APS) and TEMED (tetramethylethylene diamine) were added. After the resulting mixture was allowed to stand at room temperature for 6 hours, the mixture was washed with a large amount of water to obtain a macromolecular material comprising a crosslinked structure of Ad6-DMEDA6-PRx1 (hereinafter simply referred to as a "Ad6-DMEDA6-PRx1 gel"). The maximum swelling rate of the obtained Ad6-DMEDA6-PRx1 gel was 970%. The maximum swelling rate was calculated by washing the obtained gel with water and determining the weight change before and after washing with water.

Example 2

The Ad6-DMEDA6-PRx1 gel obtained in Example 1 was sampled in a predetermined size and dried to obtain a macromolecular material in the form of a film (hereinafter simply referred to as "Ad6-DMEDA6-PRx1 film").

Example 3

A macromolecular material gel (hereinafter simply referred to as "Ad3-DMEDA6-PRx1 gel") was obtained in the same manner as in Example 1 except that Ad3-DMEDA6-PRx1 was used in place of Ad6-DMEDA6-PRx1. The maximum swelling rate of the obtained Ad3-DMEDA6-PRx1 gel was 1700%.

Example 4

A macromolecular material gel (hereinafter simply referred to as "Ad6-DMEDA3-PRx1 gel") was obtained in the same manner as in Example 1 except that Ad6-DMEDA3-PRx1 was used in place of Ad6-DMEDA6-PRx1. The maximum swelling rate of the obtained Ad6-DMEDA3-PRx1 gel was 2460%.

Example 5

Using PRx2 obtained in Synthesis Example 2 as a polyrotaxane molecule, a self-restoring macromolecular material was produced in accordance with the reaction pathway shown in FIG. 3.

After PRx2 was dissolved in DMSO, 1,4-phenyldiboronic acid (PDB) was added to prepare a mixture having a PDB content of 15 wt % and a PRx2 content of 10 wt %. After the mixture was stirred, the resulting mixture was allowed to stand for several minutes to obtain a gel (hereinafter simply referred to as a "PRx2-PBD gel").

Example 6

Figure 13:
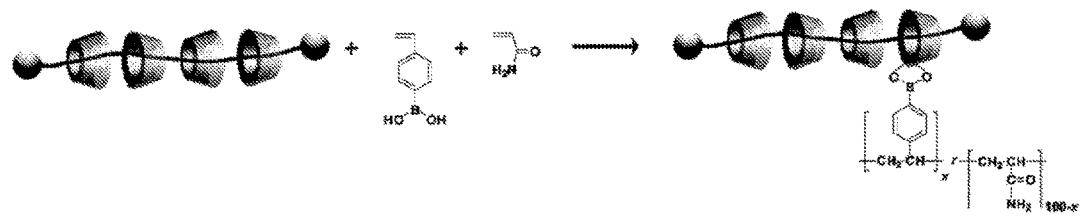
FIG. 13 depicts Synthetic Scheme 7 in which a self-restoring macromolecular material was produced. In Synthetic Scheme 7, "-r-" means that the units are arranged at random (i.e., a random copolymer).

Using PRx2 obtained in Synthesis Example 2 as a polyrotaxane molecule, a self-restoring macromolecular material was produced in accordance with the synthetic pathway shown in Synthetic Scheme 7—FIG. 13. In Synthetic Scheme 7, "-r-" means that the units are arranged at random (i.e., a random copolymer). The same applies to Synthetic Schemes 8, 9, and 11.

First, PRx2, vinyl phenylboronic acid (Vi-PB), and AAm at a mixing ratio (w/w) of PRx2:Vi-PB:AAm=10:9:5 and 2,2'-azobis(4-methoxy-2,4-dimethylvaleronitrile) (V-70) as an initiator were dissolved in a mixed solvent of DMSO:toluene 90:10 (v/v). Ar bubbling was performed for 1 hour. While heating at 30° C. in an oil bath, polymerization was performed overnight to obtain a gel (hereinafter simply referred to as "PRx2-pAAmPB (20) gel," wherein the parenthesized number "20" represents the mole % of the Vi-PB used.

Example 7

A self-restoring macromolecular material was produced using the PRx2 obtained in Synthesis Example 2 as a polyrotaxane molecule.

First, in accordance with the scheme shown in Synthetic Scheme 8 below, AAm (307 mg, 4.32 mmol), Vi-PB (71 mg, 0.480 mmol), and an initiator AIBN (7.90 mg) were dissolved in 3 mL of DMSO, and Ar bubbling was performed for 1 hour. While heating at 70° C. in an oil bath, polymerization was performed overnight. The resulting liquid was reprecipitated into methanol to obtain a polymer pAAm-PB in which some of the side chains of the repeating structural units of polyacrylic acid were modified with phenylboronic acid.

Synthetic Scheme 8

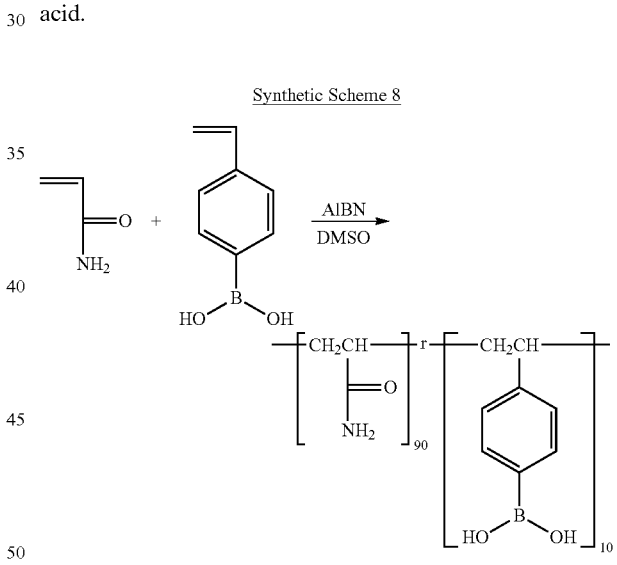

Figure 14:
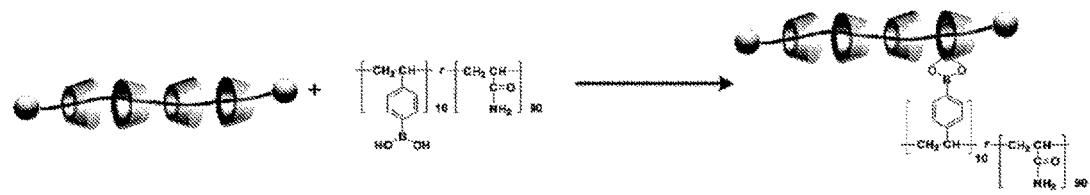
FIG. 14 depicts Synthetic Scheme 9 in which a gel was obtained by mixing a solution of the AAm-PB in DMSO and a solution of PRx2 in DMSO. In Synthetic Scheme 9, "-r-" means that the units are arranged at random (i.e., a random copolymer).

A 3 wt. % solution of the above-obtained AAm-PB in DMSO and a 3 wt. % solution of PRx2 in DMSO were mixed. A gel (hereinafter simply referred to as "PRx2-pAAmPB mixed gel") was obtained in accordance with the synthetic scheme shown in Synthetic Scheme 9—FIG. 14.

Example 8

A self-restoring macromolecular material was produced using the PRx2 obtained in Synthesis Example 2 as a polyrotaxane molecule.

First, in accordance with the scheme shown in Synthetic Scheme 10 below, polyacrylic acid (pAA, Mw: 250000) was dissolved in anhydrous DMF, and a molecular sieve 4A and BOP were added. 3-Aminophenyl boronic acid (3-amino PB) and triethylamine were dissolved in anhydrous DMF, and the resulting solution was added dropwise at room temperature. After stirring for 12 hours, the resulting mixture was diluted with water and dialyzed with water for one week. This was lyophilized to obtain a polymer pAA-PB in which some of the side chains of the repeating structural units of polyacrylic acid were modified with phenylboronic acid. In this process, the pAA and 3-amino PB were used at a charge ratio of 5:1 (w/w).

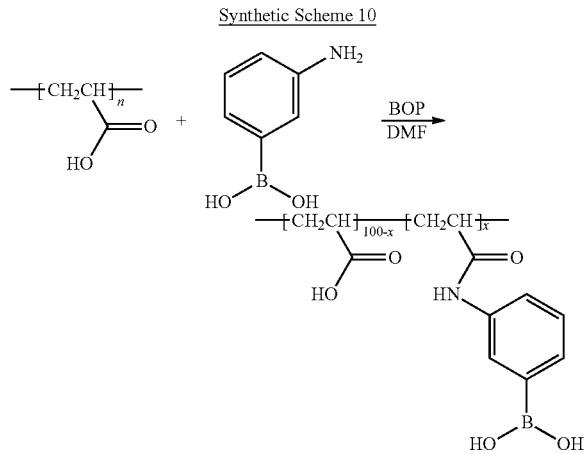

Synthetic Scheme 10

Figure 15:
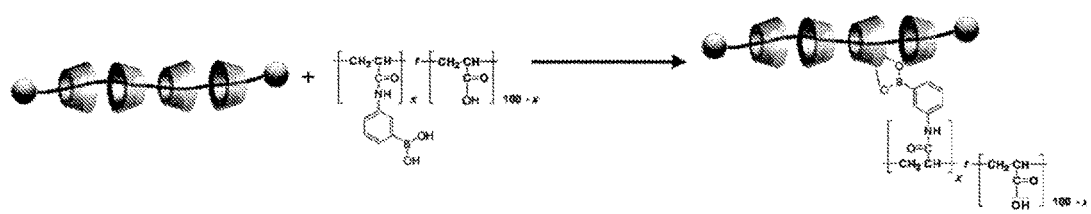
FIG. 15 depicts Synthetic Scheme 11 in which a gel was obtained by mixing PRx2 and pAA-PB were mixed at a mass ratio (PRx2:pAA-PB) of 1:1 in DMSO. In Synthetic Scheme 11, "-r-" means that the units are arranged at random (i.e., a random copolymer).

Subsequently, in accordance with the scheme shown in Synthetic Scheme 11—FIG. 15, the above-obtained PRx2 and pAA-PB were mixed at a mass ratio (PRx2:pAA-PB) of 1:1 in DMSO to obtain a gel (hereinafter simply referred to as "PRx2-pAAPB mixed gel").

Figure 7:
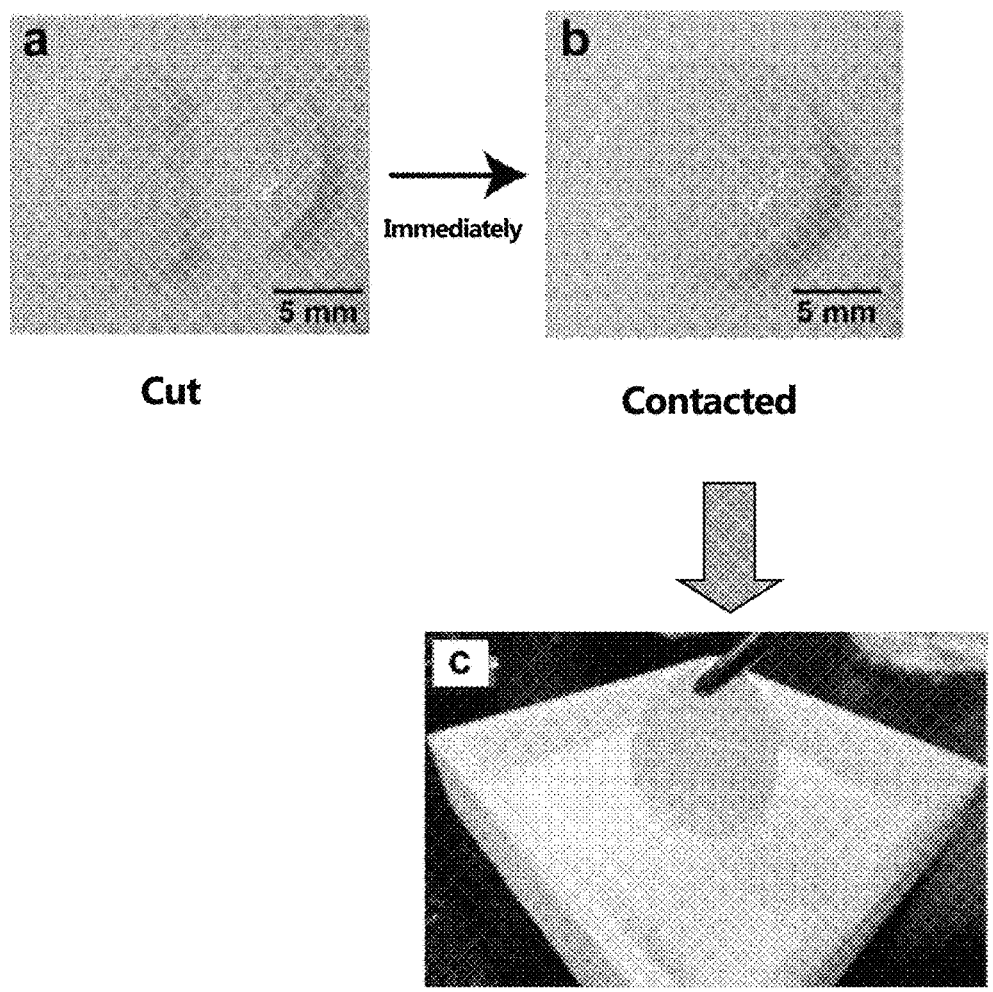
FIG. 7 contains photographs showing how the self-restorability of the Ad6-DMEDA6-PRx1 gel obtained in Example 1 was evaluated.

<Evaluation of the Macromolecular Material>
Self-Restorability of Ad6-DMEDA6-PRx1 Gel FIG. 7 shows how the self-restorability of the Ad6-DMEDA6-PRx1 gel obtained in Example 1 was evaluated. The Ad6-DMEDA6-PRx1 gel was cut with a cutter knife into the state shown in FIG. 7(*a*). Immediately after or 24 hours after the cutting, the gel pieces were brought into contact with each other as shown in FIG. 7(*b*) and picked up using tweezers. As a result, adhesion between the cut surfaces as shown in FIG. 7(*c*) was confirmed in any case, and self-restoration of the Ad6-DMEDA6-PRx1 gel was confirmed.

Figure 8:
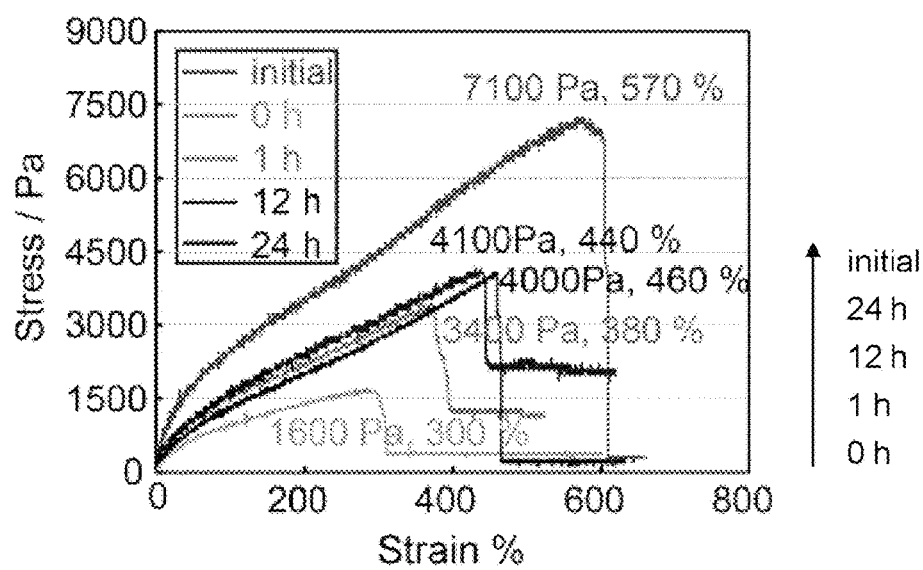
FIG. 8 is a graph showing the tracking results of changes in the self-restoration rate of the Ad6-DMEDA6-PRx1 gel with time.

FIG. 8 shows the tracking results of the self-restoration rate of the Ad6-DMEDA6-PRx1 gel with time. The self-restoration 24 hours after the contact was about 60%. Further, gel adhesion in portions other than the cut surfaces was also confirmed, although not shown in FIG. 8.

The above results suggest that the Ad6-DMEDA6-PRx1 gel is adhered through a bond between a host group and a guest group, i.e., a reversible bond.

Further, the rebonded Ad6-DMEDA6-PRx1 gel was immersed in water. The Ad6-DMEDA6-PRx1 gel whose cut surfaces were rebonded to each other did not dissociate even in water, whereas the Ad6-DMEDA6-PRx1 gel whose portions other than the fractured surfaces were adhered to each other dissociated. This result suggests that the gel whose fractured surfaces were adhered to each other was adhered through reversible bonding (host-guest interaction). When the fractured surfaces of the gel were brought into contact with each other in water, the surfaces did not adhere to each other. This suggests that in self-restoration of a gel, adhesiveness of the gel itself also has an auxiliary action and this adhesiveness facilitates providing an environment (distance) in which reversible bonding (host-guest interaction) on the gel interface is prone to occur.

Self-Restorability of Ad6-DMEDA6-PRx1 Film

The self-restorability of the Ad6-DMEDA6-PRx1 film obtained in Example 2 was evaluated in the following manner. First, the surface of the Ad6-DMEDA6-PRx1 film was artificially damaged. When 1 μL of water was dropped on the damaged part, the damaged part was confirmed to start to disappear. The film was then allowed to stand at room temperature for 12 hours. No scar was observed any more. This suggests that motility of the macromolecular chain on the film surface was enhanced by the addition of the water, which facilitates the rebonding of the broken bond, resulting in self-restoration.

Self-Restorability of the PRx2-pAAmPB (20) Gel

Figure 9:
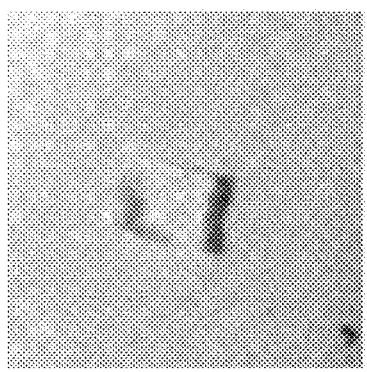
FIG. 9 contains photographs showing how the self-restorability of the PRx2-pAAmPB (20) gel obtained in Example 6 was evaluated.
Figure 9:
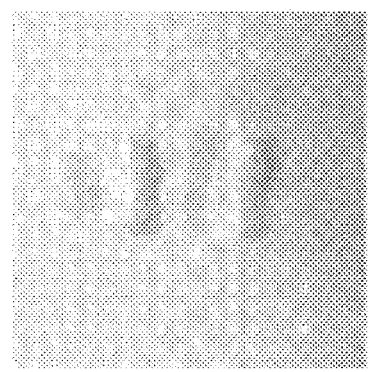
Figure 9:
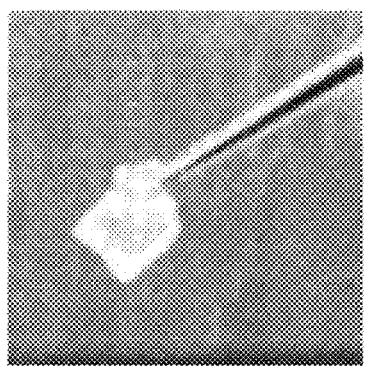

FIG. 9 shows how self-restorability of the PRx2-pAAmPB (20) gel obtained in Example 6 was evaluated. The PRx2-pAAmPB (20) gel shown in FIG. 9(*a*) was cut with a cutting knife into the state shown in FIG. 9(*b*). Immediately after or 24 hours after the cutting, the gel pieces were brought into contact with each other as shown in FIG. 9(*c*) and picked up using tweezers. As a result, adhesion between the cut surfaces was confirmed in any case, and self-restoration of the PRx2-pAAmPB (20) gel was confirmed.

Comparative Example 1

A crosslinked structure was obtained in the same manner as in Example 1 except that AAm-β-CD was not used. The obtained polymer did not gel.

Comparative Example 2

A polymerization reaction was performed using only AAm-β-CD and acrylamide, without using Ad6-DMEDA6-PRx1. The obtained polymer did not gel but collapsed during washing.

INDUSTRIAL APPLICABILITY

Since the macromolecular material of the present invention is a material having excellent self-restorability, the application of the material to various members, coating agents, etc., can enhance the durability of products and can maintain its design for a long period of time. Further, exerting the self-restorability of the macromolecular material can contribute to the safety of products, thus providing highly reliable products. Accordingly, the macromolecular material is applicable as a member of or a surface-coating agent for cellular phones, displays, automobiles, etc. Further, the macromolecular material has a high degree of flexibility in design, and can also be composed of materials harmless to the environment and the human body. Therefore, the macromolecular material is applicable not only to the engineering field but also to the medical field, the field of living organisms, food field, etc.

DESCRIPTION OF THE REFERENCE NUMERALS

1: Crosslinked structure
2: Polyrotaxane molecule
21: Cyclic molecule
21*a*: Opening
22: Linear molecule
23: Blocking group 25: First functional group
3: Second polymer
35: Second functional group

The invention claimed is:

1. A self-restoring macromolecular material comprising a crosslinked structure that is formed by crosslinking a polymer containing at least a polyrotaxane molecule,
the polyrotaxane molecule comprising a cyclic molecule and a linear molecule passing through an opening of the cyclic molecule,
the crosslinked structure being crosslinked between the cyclic molecule of the polyrotaxane molecule and a polymer molecule other than the polyrotaxane molecule via a bond between a host group and a guest group,
wherein the bond between the host group and the guest group comprises a non-covalent bond, and the host group and the guest group form an inclusion complex.

2. The self-restoring macromolecular material according to claim 1, wherein the polymer molecule further comprises a polyrotaxane molecule other than said polyrotaxane molecule.

3. The macromolecular material according to claim 1, wherein the host group is a cyclodextrin.

4. The macromolecular material according to claim 1, wherein the cyclic molecule is a cyclodextrin.

5. The macromolecular material according to claim 2, wherein the host group is a cyclodextrin.

6. The macromolecular material according to claim 2, wherein the cyclic molecule is a cyclodextrin.

7. The macromolecular material according to claim 3, wherein the cyclic molecule is a cyclodextrin.

* * * * *